(12) United States Patent
Lee et al.

(10) Patent No.: US 10,630,394 B2
(45) Date of Patent: Apr. 21, 2020

(54) WIRELESS COMMUNICATION APPARATUSES PERFORMING SELECTIVE NOISE FILTERING AND METHODS OF OPERATING THE SAME

(71) Applicant: Samsung Electronics Co., Ltd., Suwon-si, Gyeonggi-do (KR)

(72) Inventors: Hae-chul Lee, Yongin-si (KR); Seong-ho Kim, Suwon-si (KR); Sung-won Park, Suwon-si (KR); Uk-hyeon Shin, Suwon-si (KR); Sang-un Oh, Suwon-si (KR); Seung-yup Lee, Hwaseong-si (KR); Jong-Min Lee, Seongnam-si (KR); Jung-su Han, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/222,217

(22) Filed: Dec. 17, 2018

(65) Prior Publication Data
US 2019/0190622 A1    Jun. 20, 2019

(30) Foreign Application Priority Data

Dec. 20, 2017  (KR) .................. 10-2017-0176247
Jun. 15, 2018  (KR) .................. 10-2018-0069062

(51) Int. Cl.
*H04B 15/00*  (2006.01)
*H04B 1/10*  (2006.01)
*H04B 1/12*  (2006.01)

(52) U.S. Cl.
CPC ............ *H04B 15/00* (2013.01); *H04B 1/1027* (2013.01); *H04B 1/12* (2013.01); *H04B 1/123* (2013.01)

(58) Field of Classification Search
CPC ............................................ H04B 15/00–15/06
See application file for complete search history.

(56) References Cited

U.S. PATENT DOCUMENTS 4,052,678 A  *  10/1977  Ramsland ............ H03G 3/3015
                                                             330/281
5,812,673 A       9/1998  Nohara et al.
(Continued)

FOREIGN PATENT DOCUMENTS

JP        2001144696 A  *  5/2001
JP          3330587         7/2002
(Continued)

*Primary Examiner* — Gennadiy Tsvey
(74) *Attorney, Agent, or Firm* — Harness, Dickey & Pierce, P.L.C.

(57) ABSTRACT

A method performed by at least one processor of a wireless communication apparatus including a plurality of internal components, the method includes generating a plurality of sets of noise information corresponding to a plurality of test noise signals generated by the plurality of internal components under a plurality of state conditions, receiving a radio frequency (RF) signal, determining a magnitude of a noise signal that interferes with the RF signal by using a set of noise information corresponding to a current state condition from among the plurality of sets of noise information, and performing noise filtering on the RF signal based on a magnitude of the RF signal and the magnitude of the noise signal.

18 Claims, 25 Drawing Sheets

(56) References Cited

U.S. PATENT DOCUMENTS

| | | |
|---|---|---|
| 7,603,093 B2 | 10/2009 | Kremer et al. |
| 8,391,862 B1 | 3/2013 | Harju et al. |
| 8,515,466 B2 | 8/2013 | Zhang et al. |
| 9,385,780 B2 | 7/2016 | Alloin et al. |
| 9,386,162 B2 | 7/2016 | Yang et al. |
| 9,629,101 B1 | 4/2017 | Eriksson et al. |
| 2004/0185815 A1* | 9/2004 | Fukuda ............ H04B 1/123 455/296 |
| 2005/0096859 A1* | 5/2005 | Torin ............ G01R 29/26 702/69 |
| 2006/0018414 A1 | 1/2006 | Arkhipenkov et al. |
| 2009/0181632 A1* | 7/2009 | Shiba ............ H04B 1/109 455/296 |
| 2009/0197558 A1* | 8/2009 | Shiotsu ............ H04B 1/126 455/296 |
| 2011/0069738 A1* | 3/2011 | Sugino ............ G01S 13/0209 375/130 |
| 2012/0088465 A1* | 4/2012 | Yokota ............ H04B 1/1036 455/278.1 |
| 2013/0122844 A1* | 5/2013 | Itasaki ............ H04B 1/126 455/226.3 |
| 2016/0255549 A1* | 9/2016 | Lakhdhar ............ H04W 24/10 370/332 |
| 2017/0110078 A1* | 4/2017 | Kim ............ G09G 3/3685 |

FOREIGN PATENT DOCUMENTS

| | | | |
|---|---|---|---|
| JP | 2008244987 A | * | 10/2008 |
| JP | 2009253314 A | * | 10/2009 |
| JP | 2013098767 A | * | 5/2013 |
| JP | 2015-170913 | | 9/2015 |
| KR | 10-0968127 | | 7/2010 |
| KR | 10-1470407 | | 12/2014 |

* cited by examiner

FIG. 5A

| STATE CONDITION | FIRST INTERNAL COMPONENT | SECOND INTERNAL COMPONENT | THIRD INTERNAL COMPONENT | FOURTH INTERNAL COMPONENT |
|---|---|---|---|---|
| SC_1 | ON | OFF | OFF | OFF |
| SC_2 | OFF | ON | OFF | OFF |
| SC_3 | OFF | OFF | ON | OFF |
| SC_4 | OFF | OFF | OFF | ON |

FIG. 5B

| STATE CONDITION | FIRST INTERNAL COMPONENT | SECOND INTERNAL COMPONENT | THIRD INTERNAL COMPONENT | FOURTH INTERNAL COMPONENT |
|---|---|---|---|---|
| SC_1 | ON | ON | OFF | OFF |
| SC_2 | ON | OFF | ON | OFF |
| SC_3 | ON | OFF | OFF | ON |
| SC_4 | OFF | ON | ON | OFF |
| SC_5 | OFF | ON | OFF | ON |
| SC_6 | OFF | OFF | ON | ON |

FIG. 5C

| STATE CONDITION | FIRST INTERNAL COMPONENT | SECOND INTERNAL COMPONENT | THIRD INTERNAL COMPONENT | FOURTH INTERNAL COMPONENT |
|---|---|---|---|---|
| SC_1 | A1 | OFF | OFF | OFF |
| SC_2 | A2 | OFF | OFF | OFF |
| SC_3 | OFF | B1 | OFF | OFF |
| SC_4 | OFF | B2 | OFF | OFF |
| SC_5 | OFF | OFF | C1 | OFF |
| SC_6 | OFF | OFF | C2 | OFF |
| SC_7 | OFF | OFF | OFF | F1 |
| SC_8 | OFF | OFF | OFF | F2 |

FIG. 10

| STATE CONDITION | FREQUENCY BAND | MAGNITUDE OF NOISE | |
|---|---|---|---|
| SC_1 | BAND_1 | Amp_1 | |
| | BAND_2 | Amp_2 | ⎯NI_1 |
| | BAND_3 | Amp_3 | |
| | BAND_4 | Amp_4 | |
| SC_2 | BAND_1 | Amp_5 | |
| | ⋮ | ⋮ | ⎯NI_2 |

FIG. 14

| STATE CONDITION | FREQUENCY BAND | FREQUENCY Sub-BAND | MAGNITUDE OF NOISE | |
|---|---|---|---|---|
| SC_1 | BAND_1 | Sub_BAND_1a | Amp_1 | |
| | | Sub_BAND_2a | Amp_2 | ─ NI_1 |
| | | Sub_BAND_3a | Amp_3 | |
| | BAND_2 | Sub_BAND_4a | Amp_4 | |
| | | Sub_BAND_5a | Amp_5 | |
| | | Sub_BAND_6a | Amp_6 | |
| | BAND_3 | Sub_BAND_7a | Amp_7 | |
| | | Sub_BAND_8a | Amp_8 | |
| | | Sub_BAND_9a | Amp_9 | |
| | BAND_4 | Sub_BAND_10a | Amp_10 | |
| | | Sub_BAND_11a | Amp_11 | |
| | | Sub_BAND_12a | Amp_12 | |
| SC_2 | ⋮ | ⋮ | ⋮ | ─ NI_2 |

WIRELESS COMMUNICATION APPARATUSES PERFORMING SELECTIVE NOISE FILTERING AND METHODS OF OPERATING THE SAME

CROSS-REFERENCE TO RELATED APPLICATIONS

This application claims the benefit of Korean Patent Application Nos. 10-2017-0176247, filed on Dec. 20, 2017 and 10-2018-0069062, filed on Jun. 15, 2018, in the Korean Intellectual Property Office, the disclosures of which are incorporated herein in their entirety by reference.

BACKGROUND

The inventive concepts relate to wireless communication apparatuses, and more particularly, to wireless communication apparatuses performing a reliable communication operation and methods of operating the wireless communication apparatuses.

Recently, the performance of internal components (for example, a display, an image sensor, an application processor, a memory controller, a memory device, etc.) of wireless communication apparatuses has improved, and operations performed by internal components are rapidly performed. However, since internal components are operated based on clock signals having high frequencies, internal components generate noise having high frequency, and this noise causes deterioration of communication performance (for example, receiving performance) of the wireless communication apparatuses (e.g., due to signal interference).

SUMMARY

The inventive concepts provide a wireless communication apparatus for improving communication performance by selectively filtering noise from internal components of the wireless communication apparatus and a method of operating the wireless communication apparatus.

According to an aspect of the inventive concepts, there is provided a method performed by at least one processor of a wireless communication apparatus including a plurality of internal components. The method includes generating, by the at least one processor, a plurality of sets of noise information corresponding to a plurality of test noise signals generated by the plurality of internal components under a plurality of state conditions; receiving, by the at least one processor, a radio frequency (RF) signal; determining, by the at least one processor, a magnitude of a noise signal that interferes with the RF signal by using a set of noise information corresponding to a current state condition from among the plurality of sets of noise information; and performing, by the at least one processor, noise filtering on the RF signal based on a magnitude of the RF signal and the magnitude of the noise signal.

According to an aspect of the inventive concepts, there is provided a wireless communication apparatus including a plurality of internal components; a memory configured to store, computer-readable instructions, and a plurality of sets of noise information corresponding to a plurality of test noise signals generated by the plurality of internal components under a plurality of state conditions; a radio frequency (RF) integrated circuit configured to process an RF signal; and at least one processor. The at least one processor is configured to execute the computer-readable instructions to, determine a magnitude of a noise signal that interferes with the RF signal by using a set of noise information corresponding to a current state condition from among the plurality of sets of noise information, and perform noise filtering on the RF signal based on a magnitude of the RF signal and the magnitude of the noise signal.

According to an aspect of the inventive concepts, there is provided a non-transitory processor readable storage medium storing instructions. When executed by at least one processor of a wireless communications apparatus, the instructions cause the at least one processor to generate a plurality of sets of noise information corresponding to a plurality of test noise signals generated by a plurality of internal components of the wireless communications apparatus under a plurality of state conditions, determine a magnitude of a noise signal that interferes with a radio frequency (RF) signal by using a set of noise information corresponding to a current state condition from among the plurality of sets of noise information, and perform noise filtering on the RF signal based on a magnitude of the RF signal and the magnitude of the noise signal.

According to an aspect of the inventive concepts, there is provided a method performed by at least one processor of a wireless communication apparatus. the method includes performing, by the at least one processor, for each of a plurality of values of n, n being a natural number of 1 or more, controlling, by the at least one processor, an operation mode of each of a plurality of internal components to provide an nth state condition, separating, by the at least one processor, an test nth noise signal generated under the nth state condition into a plurality of frequency bands measuring, by the at least one processor, a magnitude of each of the plurality of frequency bands to generate a plurality of frequency band magnitudes, and generating, by the at least one processor, an nth set of noise information among the plurality of sets of noise information by using the plurality of frequency band magnitudes.

BRIEF DESCRIPTION OF THE DRAWINGS

Some example embodiments will be more clearly understood from the following detailed description taken in conjunction with the accompanying drawings in which:

FIGS. 5A to 5C show state conditions according to some example embodiments;

FIG. 10 shows noise information stored in memory according to some example embodiments;

FIG. 14 shows noise information stored in memory according to frequency sub-band according to some example embodiments;

DETAILED DESCRIPTION

Hereinafter, some example embodiments will be described in detail with reference to the accompanying drawings.

Figure 1:
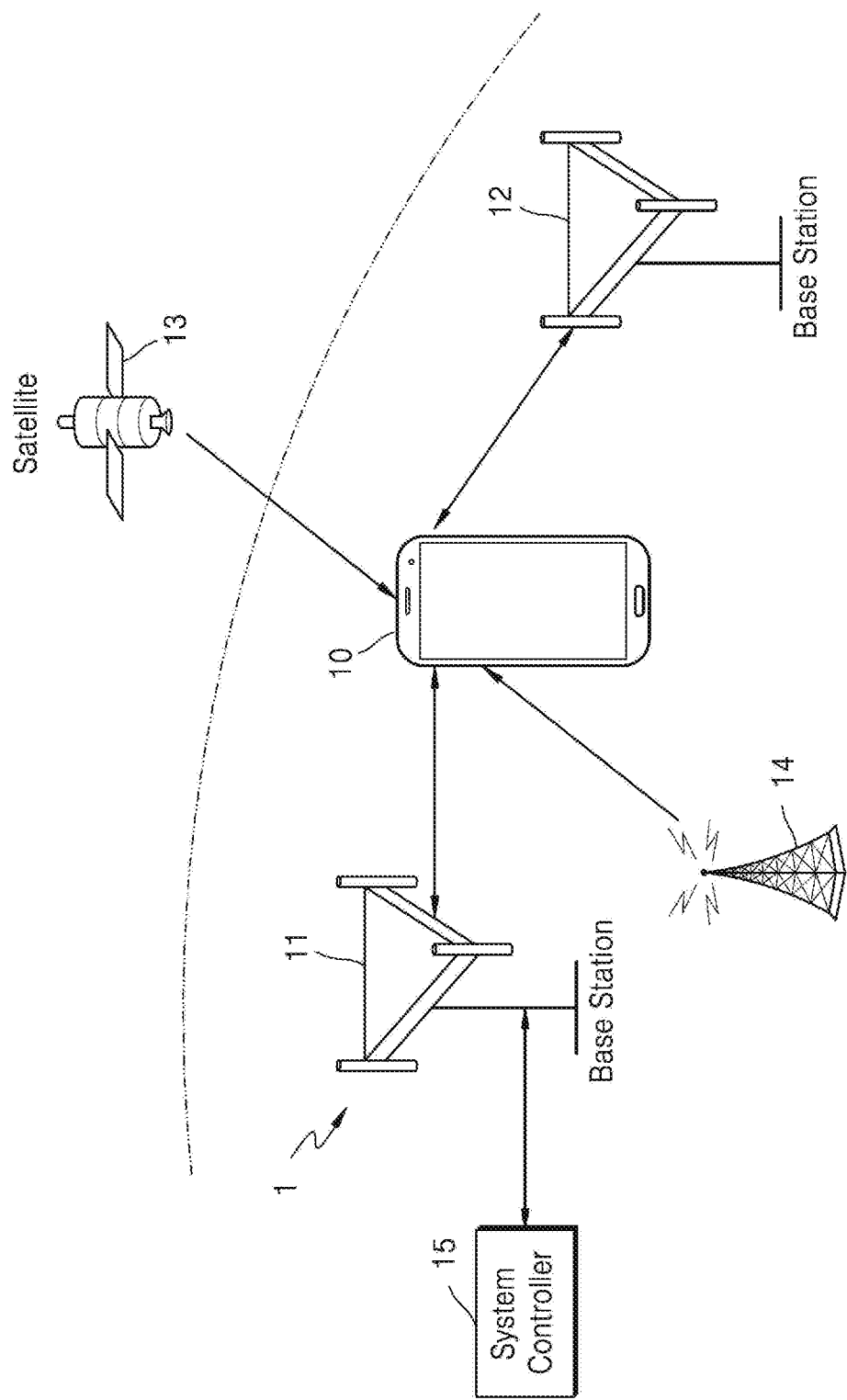
FIG. 1 shows a wireless communication apparatus performing a wireless communication operation and a wireless communication system including the wireless communication apparatus.

FIG. 1 shows a wireless communication apparatus 10 performing a wireless communication operation and a wireless communication system 1 including the wireless communication apparatus 10.

Referring to FIG. 1, the wireless communication system 1 may be one of a $5^{th}$ Generation (5G) system, a Long Term Evolution (LTE) system, a Code Division Multiple Access (CDMA) system, a Global System for Mobile communication (GSM) system, and/or a Wireless Local Area Network (WLAN) system. In some example embodiments, the CDMA system may be embodied as Wideband CDMA (WCDMA), Time Division Synchronization CDMA (TD-SCDMA), cdma2000, and/or the like.

The wireless communication system 1 may include at least two base stations, for example, base stations 11 and 12 and a system controller 15. However, this is an example only, and the wireless communication system 1 may include a different number of base stations, system controllers and/or wireless communication apparatuses. The wireless communication apparatus 10 may include user equipment, a mobile station, a mobile terminal, a user terminal, a subscriber station, a mobile apparatus, and/or the like. The base stations 11 and 12 may include the wireless communication apparatus 10, and/or a fixed station that communicates with other base stations and/or the wireless communication apparatus 10. The base stations 11 and 12 may communicate with the wireless communication apparatus 10 and/or other base stations to transmit and/or receive a data signal and/or a radio frequency (RF) signal including control information. The base stations 11 and 12 may include a Node B, an evolved-Node B (eNB), a base transceiver system (BTS), an access point (AP), and/or the like.

The wireless communication apparatus 10 may communicate with the wireless communication system 1 and may receive signals from a broadcast station 14. Furthermore, the wireless communication apparatus 10 may receive signals from a satellite 13 of a Global Navigation Satellite System (GNSS). The wireless communication apparatus 10 may support radio technology for wireless communication (for example, 5G, LTE, CDMA, cdma2000, WCDMA, TD-SCDMA, GSM, 802.11, etc.).

The wireless communication apparatus 10 may include a plurality of internal components to provide various services. The internal components of the wireless communication apparatus 10 may, as described above, generate noise that interferes with radio frequency (RF) signals received by the wireless communication apparatus 10, and the noise generated by the internal components may vary according to an operation mode of each of the internal components. The operation mode of each of the internal components may correspond to an on/off state of internal components, an operation state defined by the frequency of a clock signal based on which internal components are operated, and/or various operation states defined in a case when internal components are turned on (for example, an active state or an idle state). The types of operation modes may vary depending on the internal components.

The wireless communication apparatus 10 according to some example embodiments may control an operation mode of each of the internal components to form a plurality of state conditions and may generate information about noise generated under each state condition (also referred to herein as "noise information"). A state condition is a parameter that is distinguishable according to an operation mode of internal components. For each state condition, an operation mode of at least one of the internal components may be different from an operation mode of other internal components. A state condition may be set based on an operation mode of all internal components of the wireless communication apparatus 10. However, the some example embodiments are not limited thereto. In one or more example embodiments, the state condition may be set based on an operation mode of some internal components of the wireless communication apparatus 10. Furthermore, internal components that control an operation mode to set a state condition may include components that operate based on a clock signal having a frequency that is higher than a reference value. The wireless communication apparatus 10 may store the generated noise information in an internal memory. The noise information may include information about the frequency and magnitude of noise generated from internal components under each state condition. The noise information will be described in detail with reference to FIGS. 10 and 13.

The wireless communication apparatus 10 may perform selective noise filtering on RF signals by using noise information which has been set according to a state condition. When the wireless communication apparatus 10 receives RF signals for wireless communication from the base station 11, the wireless communication apparatus 10 detects a current state condition corresponding to a current operation mode of an internal component and obtains the magnitude of noise interfering with the RF signals by using noise information corresponding to the current state condition from among a plurality of sets of noise information (also referred to herein as "pieces of noise information"). The wireless communication apparatus 10 may perform selective noise filtering based on the magnitude of an RF signals and the obtained magnitude of the noise.

During wireless communication, the wireless communication apparatus 10 may quickly, accurately identify noise that interferes with an RF signal by referring to noise information, and due to selective noise filtering, the communication performance of the wireless communication apparatus 10 (for example, a receiving performance) may be improved.

Figure 2:
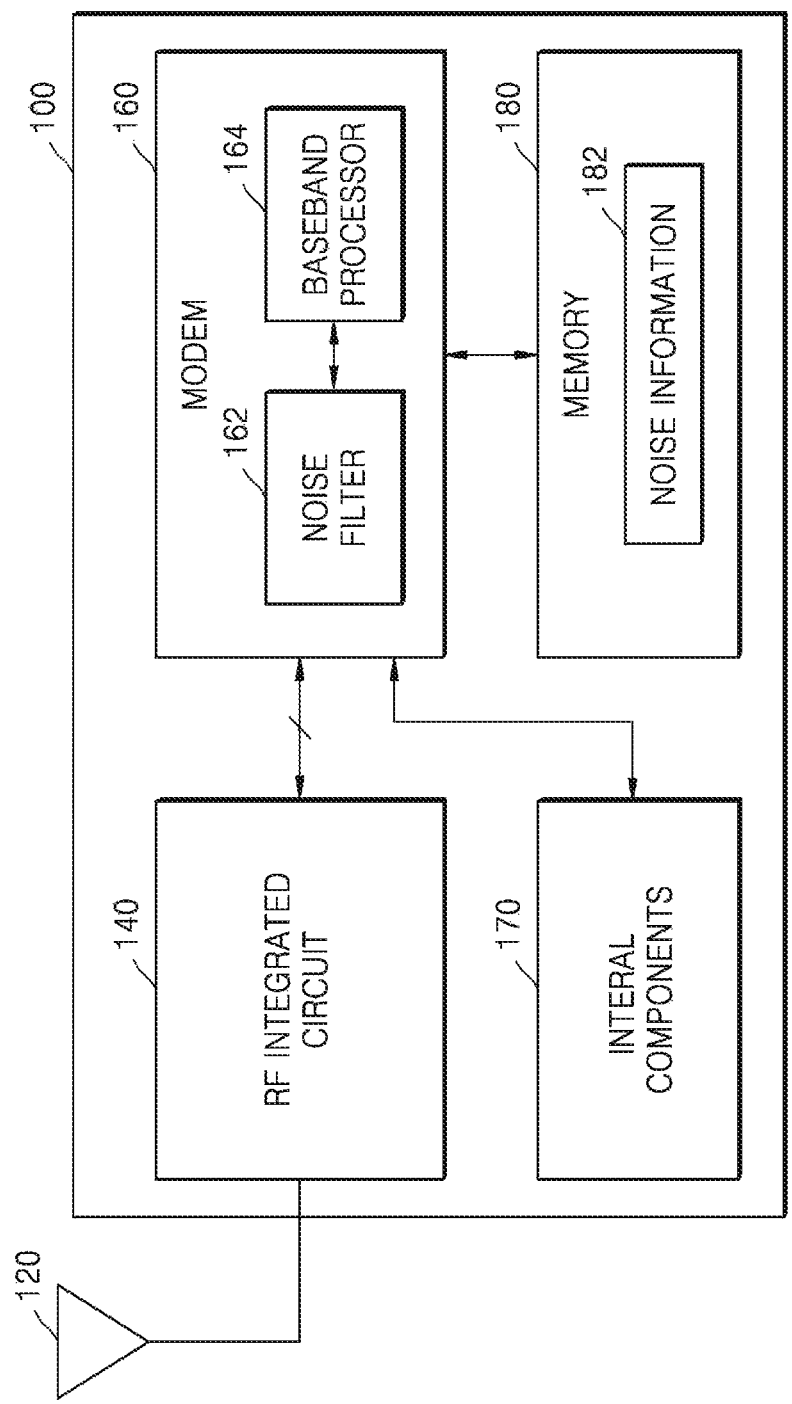
FIG. 2 is a block diagram of a wireless communication apparatus 100 according to some example embodiments.
Figure 3:
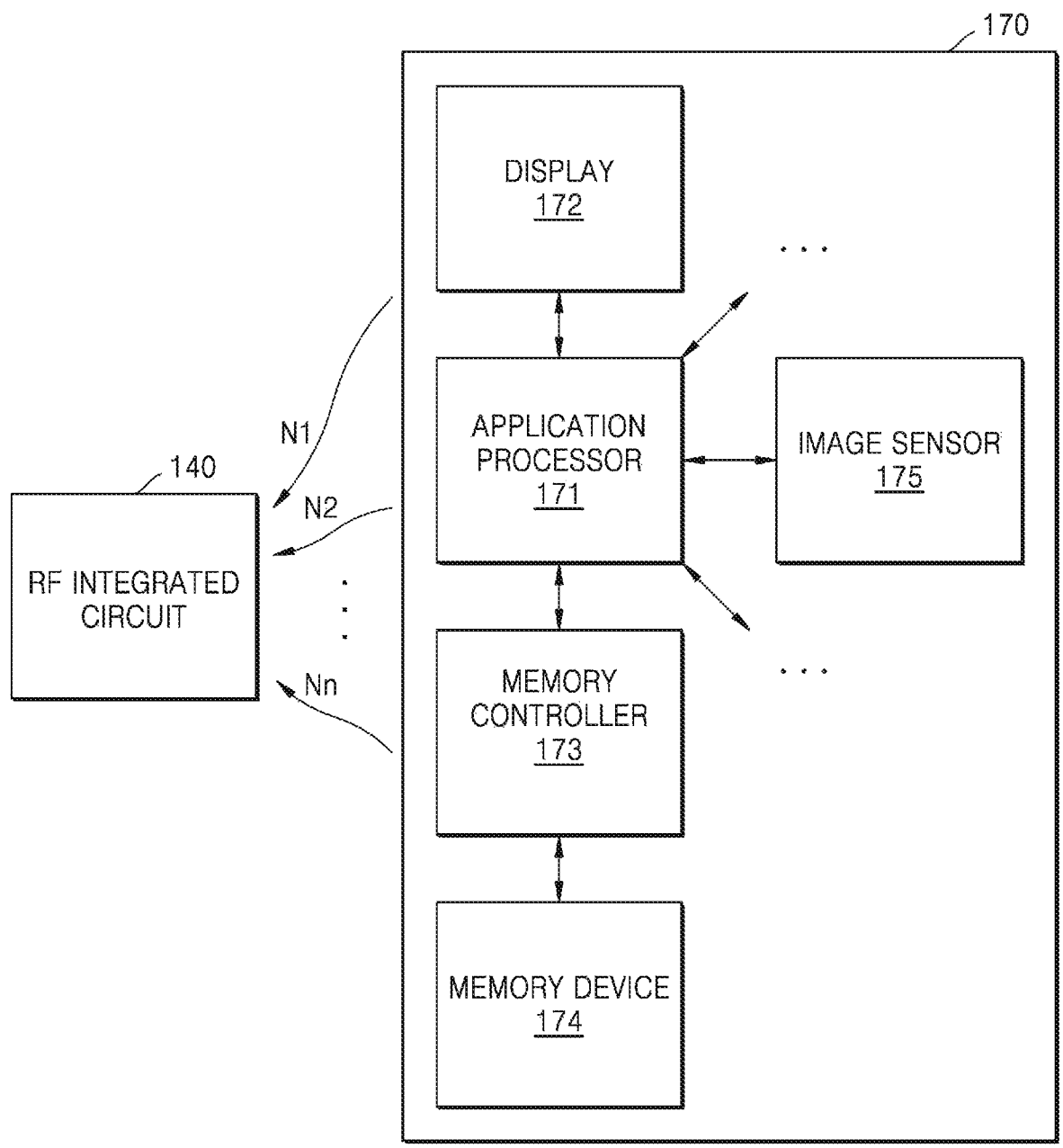
FIG. 3 is a block diagram of internal components of the wireless communication apparatus of FIG. 2.

FIG. 2 is a block diagram of a wireless communication apparatus 100 according to some example embodiments, and FIG. 3 is a block diagram of internal components of the wireless communication apparatus 100 of FIG. 2. The wireless communication apparatus 100 may be similar to or the same as the wireless communication apparatus 10 discussed in association with FIG. 1.

Referring to FIG. 2, the wireless communication apparatus 100 may include an antenna 120, an RF integrated circuit 140, a modem 160, and a memory 180. The antenna 120 may receive an RF signal from the outside (e.g., from another device via a wireless communication network). The RF integrated circuit 140 may convert the RF signal into a baseband signal and may allow data signals within the RF signal to be amplified while suppressing noise. The modem 160 may demodulate the baseband signal into an information signal according to a corresponding communication method of the wireless communication apparatus 100. For example, the modem 160 may demodulate a baseband signal based on a communication method such as CDMA, WCDMA, High-Speed Downlink Packet Access (HSDPA), LTE, and/or 5G.

The modem 160 may include a noise filter 162 and a baseband processor 164. In some example embodiments, the baseband processor 164 generates noise information 182 about noise generated under a plurality of state conditions according to an operation mode of internal components (see 170 of FIG. 3) of the wireless communication apparatus 100 and stores the noise information 182 in the memory 180. When generating the noise information 182, the baseband processor 164 may control the RF integrated circuit 140 in such a way that the wireless communication apparatus 100 does not receive or transmit external signals through the antenna 120. According to some example embodiments, operations described herein as being performed by any or all of the wireless communication apparatus 100, the RF integrated circuit 140, the modem 160, the internal components 170, and the noise filter 162 may be performed by at least one processor (e.g., the baseband processor 164) executing program code that includes instructions corresponding to the operations. The instructions may be stored in a memory of the wireless communication apparatus 100 (e.g., the memory 180). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA). According to some example embodiments, the RF integrated circuit 140 and the noise filter 162 may be implemented using circuits or circuitry and/or at least one processor executing firmware as discussed below in association with FIGS. 7A-7B and 18.

Referring to FIG. 3, the wireless communication apparatus 100 may include internal components 170. The internal components 170 may include, for example, an application processor 171, a display 172, a memory controller 173, a memory device 174, and/or an image sensor 175 (or a camera). The internal components 170 may further include various other components for providing various services to a user, in addition to or instead of the specific components depicted in FIG. 3. According to some example embodiments, operations described herein as being performed by any or all of the application processor 171, the display 172, the memory controller 173, and the image sensor 175 may be performed by at least one processor (e.g., the baseband processor 164 and/or the application processor 171) executing program code that includes instructions corresponding to the operations. The instructions may be stored in a memory of the wireless communication apparatus 100 (e.g., the memory 180 and/or the memory device 174). According to some example embodiments, the memory 174 may be the memory device 180. The internal components 170 may each operate in various operation modes based on clock signals having certain frequencies. When the wireless communication apparatus 100 performs wireless communication, at least one of the internal components 170 performs an operation, and due to this operation, noise N1-Nn interfering with the wireless communication may be generated. The RF integrated circuit 140 is configured to have a structure suitable for receiving signals, and accordingly, the noise N1-Nn generated according to the operation mode of each of the internal components 170 may be received by the RF integrated circuit 140. The frequency characteristics and noise magnitudes may be the same or different depending on the noise N1-Nn.

Referring to FIG. 2, the baseband processor 164 may generate the noise information 182 by using a noise signal (e.g., a test noise signal) output by the RF integrated circuit 140 under each state condition. During wireless communication, the baseband processor 164 may obtain information about a current state condition corresponding to a current operation mode of the internal components (see 170 of FIG. 3) and may obtain noise information corresponding to the current state condition from the noise information 182. The baseband processor 164 may identify the frequency band of the RF signal received for wireless communication and may use the frequency band of the RF signal and the obtained noise information to obtain the magnitude of a noise that interferes with the RF signal. The baseband processor 164 may control the noise filter 162 based on the magnitude of the RF signal and the magnitude of the obtained noise, thereby performing selective noise filtering. When the ratio of the magnitude of the RF signal to the magnitude of obtained noise exceeds a threshold value, the baseband processor 164 may turn on (or activate) the noise filter 162 to allow the RF signal to pass through the noise filter 162, thereby performing noise-filtering. Otherwise, when the ratio of the magnitude of the RF signal to the magnitude of obtained noise does not exceed the threshold value, the noise filter 162 may be turned off (or inactivated).

Figure 4:
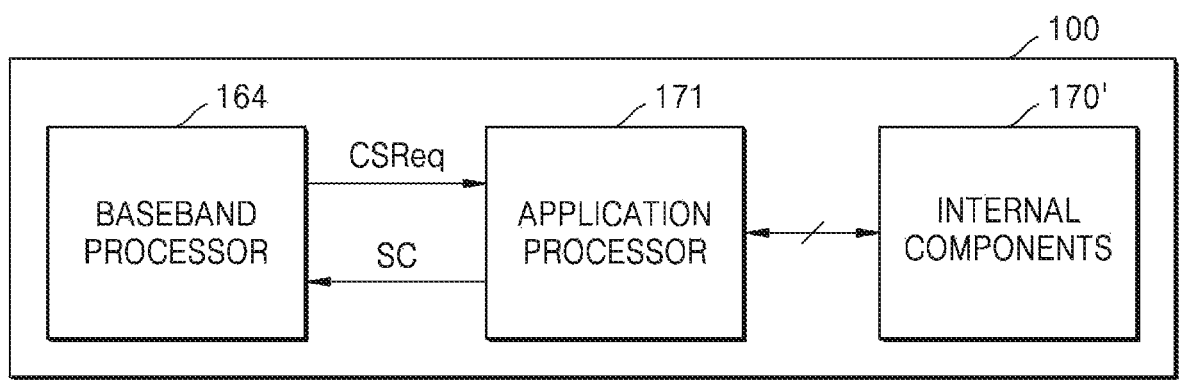
FIG. 4 shows a diagram to explain an operation of generating noise information of a wireless communication apparatus according to some example embodiments.

FIG. 4 shows a diagram to explain an operation of generating noise information of the wireless communication apparatus 100 according to some example embodiments, and FIGS. 5A to 5C show state conditions according to some example embodiments. Hereinafter, how to control the operation mode of each of internal components when noise information is generated will be described in detail.

Referring to FIG. 4, the wireless communication apparatus 100 may include the baseband processor 164, the application processor 171, and internal components 170'. The baseband processor 164 may generate or update noise information at certain intervals. The longer the wireless communication apparatus 100 is used, the higher the likelihood that the state of the internal components 170' changes, and correspondingly, the characteristics of noise generated by the internal components 170' may be changed. Accordingly, whenever the wireless communication apparatus 100 reaches its use period, the baseband processor 164 may generate or update noise information. When the wireless communication apparatus 100 is turned on or rebooted, noise information may be generated or updated. In some example embodiments, depending on how long the wireless communication apparatus 100 is used, the use period may be changed.

To generate noise information, the baseband processor 164 may provide the application processor 171 with an operation mode control request (CSReq) to control the operation mode of the internal components 170'. In response to the operation mode control request (CSReq), the application processor 171 may control the operation mode of each of the internal components 170' together with the operation mode of the application processor 171. The application processor 171 may provide the baseband processor 164 with state condition (SC) information indicating a state condition corresponding to each of the operation mode of the application processor 171 and the operation mode of each of the internal components 170'. The baseband processor 164 may generate noise information generated under the state condition. Until providing state condition (SC) information about all state conditions to the baseband processor 164, the application processor 171 may control, together with its operation mode, the operation mode of each of the internal components 170', and the baseband processor 164 may generate noise information corresponding to each of the state conditions. However, this is an example only, and the inventive concepts are not limited thereto. In one or more example embodiments, the baseband processor 164 may directly control the operation mode of each of the application processor 171 and the internal components 170'.

FIGS. 5A to 5C are used to explain how to generate noise information by selecting first through fourth internal components selected from internal components of the wireless communication apparatus 100. However, this is an example only, and the inventive concepts are not limited thereto.

Referring to FIG. 5A, a first state condition SC_1 refers to a condition in which from among first through fourth internal components, only the first internal component is turned on and the other internal components are turned off. A second state condition SC_2 refers to a condition in which from among the first through fourth internal components, only the second internal component is turned on and the other internal components are turned off. A third state condition SC_3 refers to a condition in which from among the first through fourth internal components, only the third internal component is turned on and the other internal components are turned off. A fourth state condition SC_4 refers to a condition in which from among the first through fourth internal components, only the fourth internal component is turned on and the other internal components are turned off. The baseband processor (see 164 of FIG. 4) may analyze noise transmitted by the RF integrated circuit (see 140 of FIG. 3) according to the first through fourth state conditions SC_1 through SC_4 and generate noise information. As described above, the first through fourth state conditions SC_1 through SC_4 may be defined to analyze noise generated by each of the first through fourth internal components.

Referring to FIG. 5B, a first state condition SC_1 refers to a condition in which from among the first through fourth internal components, the first and second internal components are turned on and the other internal components are turned off. A second state condition SC_2 refers to a condition in which from among the first through fourth internal components, the first and third internal components are turned on and the other internal components are turned off. A third state condition SC_3 refers to a condition in which from among the first through fourth internal components, the first and fourth internal components are turned on and the other internal components are turned off. A fourth state condition SC_4 refers to a condition in which from among the first through fourth internal components, the second and third internal components are turned on and the other internal components are turned off. A fifth state condition SC_5 refers to a condition in which from among the first through fourth internal components, the second and fourth internal components are turned on and the other internal components are turned off. A sixth state condition SC_6 refers to a condition in which from among the first through fourth internal components, the third and fourth internal components are turned on and the other internal components are turned off. The baseband processor (see 164 of FIG. 4) may analyze noise transmitted by the RF integrated circuit (see 140 of FIG. 3) according to the first through sixth state conditions SC_1 through SC_6 and generate noise information. As described above, the first through sixth state conditions SC_1 through SC_6 may be defined to analyze noise generated by a combination of two internal components from among the first through fourth internal components.

Referring to FIG. 5C, it is assumed that each of the first through fourth internal components have two operation modes when turned on (the first internal component has two operation modes 'A1' and 'A2', the second internal components has two operation modes 'B1' and 'B2', the third internal component has two operation modes 'C1' and 'C2', and the fourth internal component has two operation modes 'F1' and 'F2'). However, this is an example only, and each of the first through fourth internal components may have a different operation mode. A first state condition SC_1 refers to a condition in which from among the first through fourth internal components, only the first internal component is turned on and operated in the operation mode 'A1,' and the other internal components are turned off. A second state condition SC_2 refers to a condition in which from among the first through fourth internal components, only the first internal component is turned on and operated in the operation mode 'A2,' and the other internal components are turned off. A third state condition SC_3 through an eighth state condition SC_8 are similar to the first and second state conditions SC_1 and SC_2, and thus, explanation thereof will be omitted herein. The baseband processor (see 164 of FIG. 4) may analyze noise transmitted by the RF integrated circuit (see 140 of FIG. 3) according to the first through eighth state conditions SC_1 through SC_8 and generate noise information. As described above, the first through eighth state conditions SC_1 through SC_8 may be defined to analyze noise generated by each of the first through fourth internal components.

The example embodiments described in connection with FIGS. 5A to 5C are provided herein for illustrative purpose only, and the inventive concepts are not limited thereto. To effectively analyze internal noise that is likely to interfere with RF signals for wireless communication operations, the state condition may be set in various manners by taking into consideration the frequency of clock signals based on which internal components are operated, consumption power, or the like.

Figure 6:
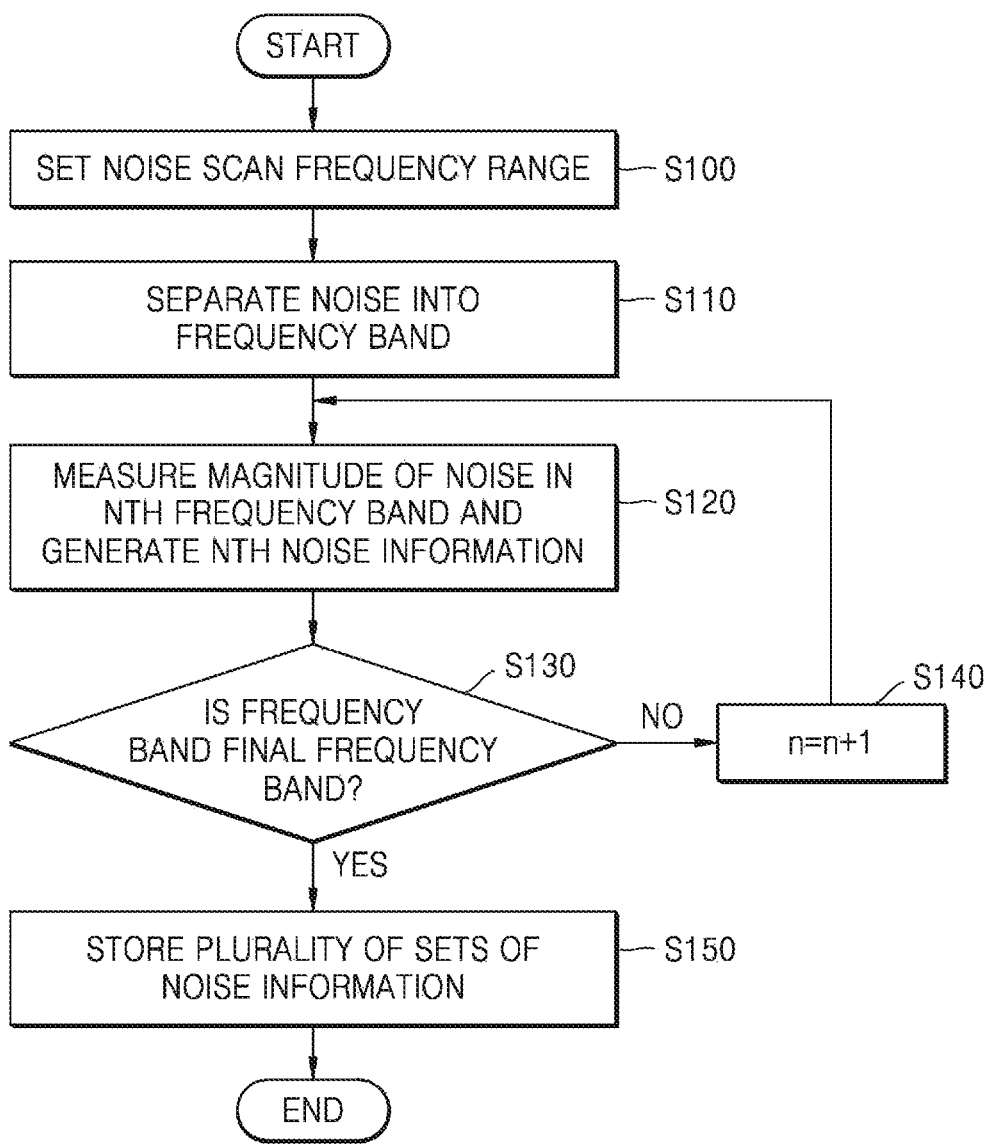
FIG. 6 is a flowchart of a method of generating noise information about a wireless communication apparatus according to some example embodiments.

FIG. 6 is a flowchart to explain a method of generating noise information about a wireless communication apparatus (e.g., the wireless communication apparatus 100) according to some example embodiments.

Referring to FIG. 6, the wireless communication apparatus may set a noise scan frequency range (S100). The frequency range of an RF signal that the wireless communication apparatus may receive from the outside may be set in advance, and, based on the frequency range of the received RF signal, the wireless communication apparatus may set the noise scan frequency range (S100). For example, a provider providing a wireless communication infrastructure (infra) is allocated a frequency for providing a wireless communication service, and a wireless communication apparatus may have already stored information about the frequency range allocated to the subscribing provider. Accordingly, the wireless communication apparatus may set the frequency range of the noise scanned based on information about the stored frequency range of the RF signal corresponding to the provider. The noise scan frequency range may include a plurality of frequency bands. A frequency band may have a width and a central frequency which vary according to a communication method, such as CDMA, WCDMA, HSDPA, LTE, and/or 5G. The wireless communication apparatus may separate noise according to the noise scan frequency range according to a plurality of frequency bands based on the corresponding communication method (S110). The wireless communication apparatus measures the magnitude of noise in the nth (where n is a natural number of 1 or more, and initialized at 1) frequency band of the noise scan frequency range, and based on the measured magnitude of noise and the corresponding nth frequency band, the wireless communication apparatus may generate the nth noise information (S120). The wireless communication apparatus may determine whether the nth frequency band is the last frequency band in the noise scanning frequency range (S130). When the n-th frequency band is not the last frequency band (S130, NO), n may be incremented by one (S140) and operation S120 may be performed. Otherwise, when the nth frequency band is the last frequency band (S130, YES), the wireless communication apparatus may store the noise information in an internal memory (S150).

Figure 7A:
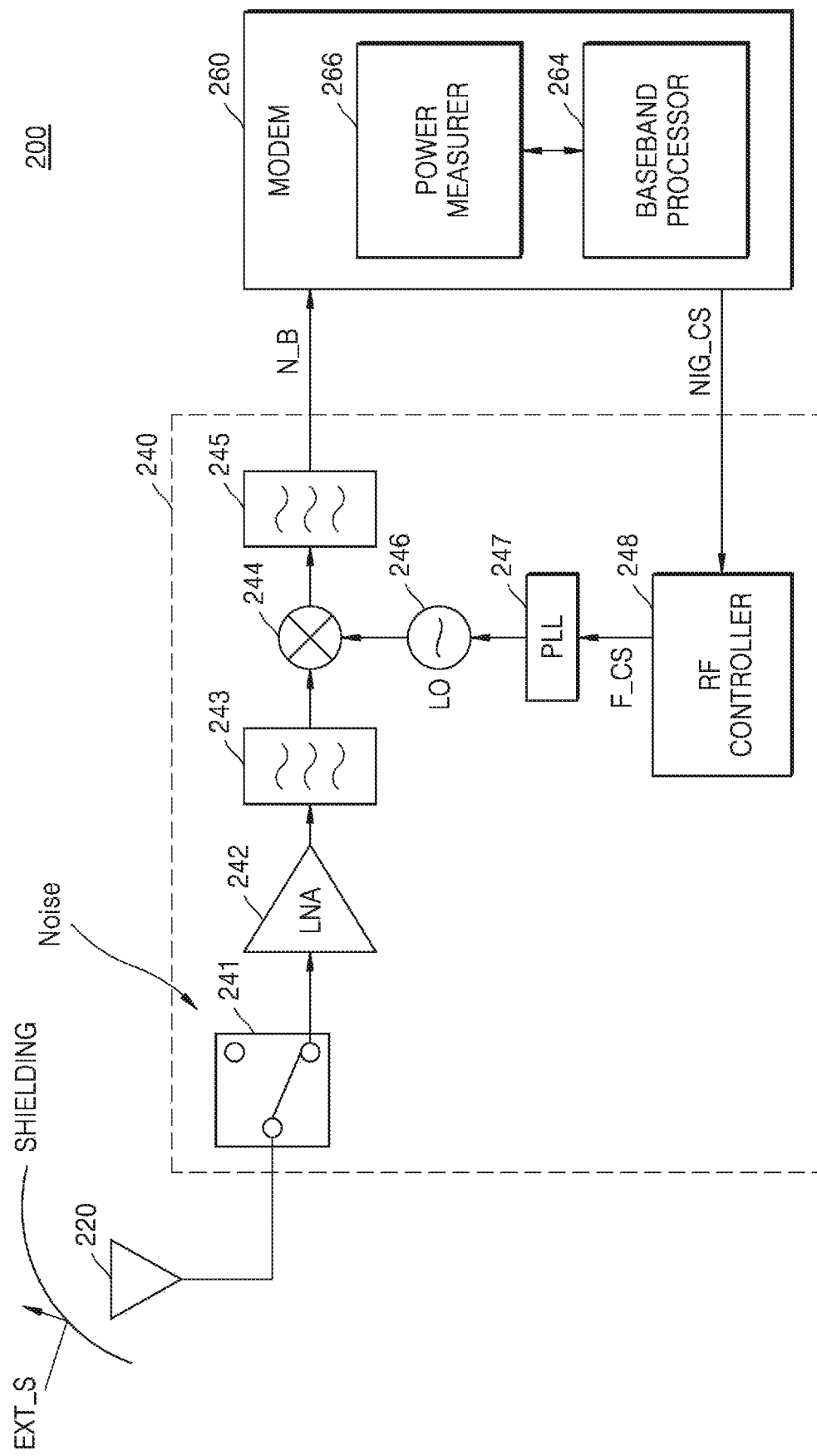
FIGS. 7A and 7B show block diagrams of a wireless communication apparatus 200 according to some example embodiments.
Figure 7B:
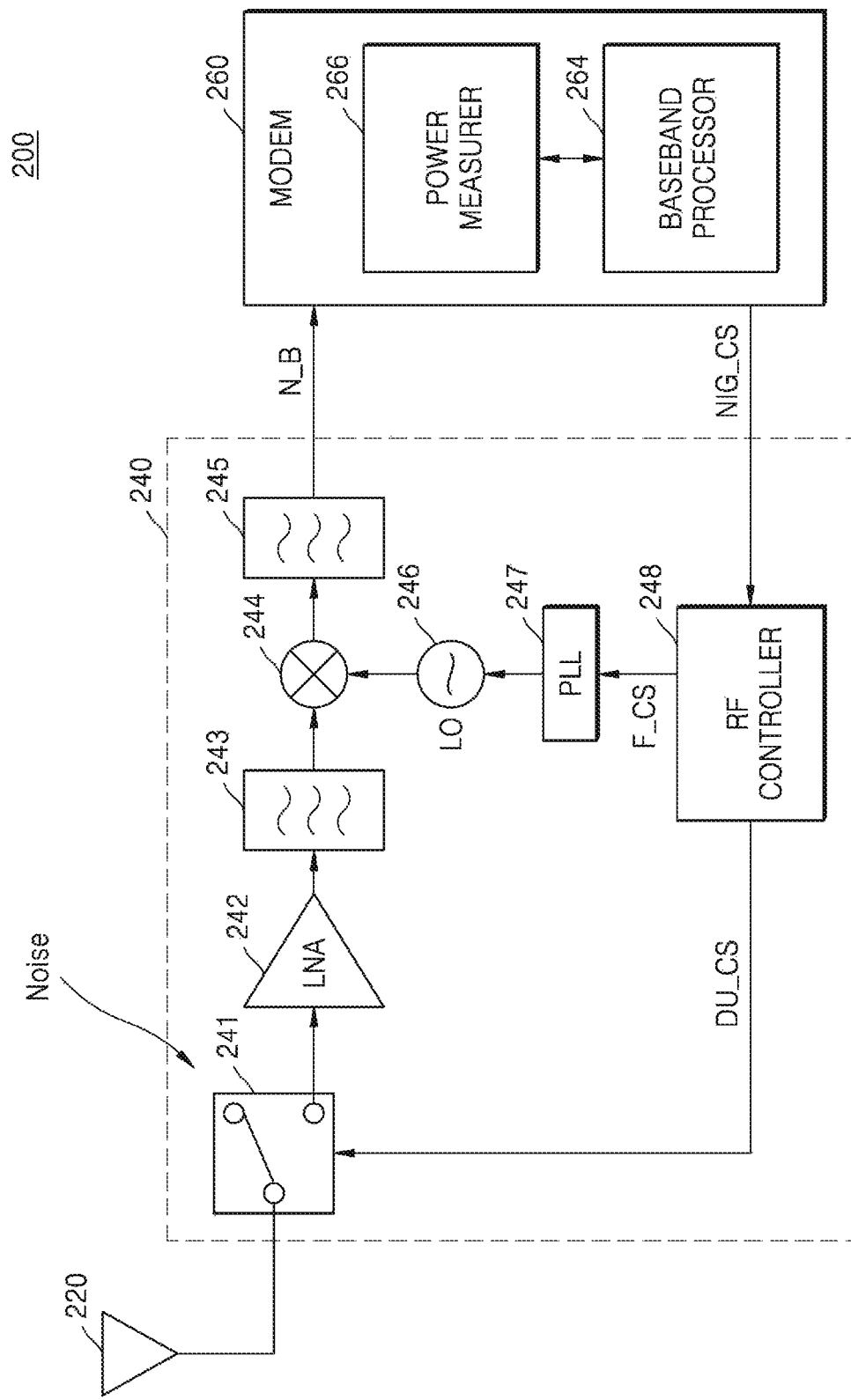

FIGS. 7A and 7B show block diagrams of a wireless communication apparatus 200 according to some example embodiments.

Referring to FIG. 7A, the wireless communication apparatus 200 may include an antenna 220, an RF integrated circuit 240, and a modem 260. The RF integrated circuit 240 may include a duplexer 241, a low-noise amplifier 242, a band-pass filter 243, a low-pass filter 245, a mixer 244, a local oscillator 246, a phase-locked loop (PLL) circuit 247, and an RF controller 248. According to some example embodiments, the duplexer 241, the low-noise amplifier 242, the band-pass filter 243, the low-pass filter 245, the mixer 244, the local oscillator 246, the phase-locked loop (PLL) circuit 247, and the RF controller 248 may be implemented using circuits or circuitry and/or at least one processor executing firmware. The modem 260 may include a baseband processor 264 and a power measurer 266. According to some example embodiments, operations described herein as being performed by any or all of the wireless communication apparatus 200, the modem 260, and the power measurer 266 may be performed by at least one processor (e.g., the baseband processor 264) executing program code that includes instructions corresponding to the operations. The instructions may be stored in a memory of the wireless communication apparatus 200 (e.g., memory 280 discussed below). The duplexer 241 may be controlled to use the antenna 220 for transmission or reception. Hereinafter, it is assumed that the RF integrated circuit 240 is in the reception mode. The low-noise amplifier 242 may amplify a noise and provide the amplified noise to the band-pass filter 243. The amplified noise passes through the band-pass filter 243 and the filtered noise may be frequency down-converted with a signal generated from the local oscillator 246 via the mixer 244. The converted noise may be provided to the modem 260 as a noise signal N_B through the low-pass filter 245.

In some example embodiments, currently, the wireless communication apparatus 200 may be shielded and may not receive an external signal EXT_S via the antenna 220, and a noise caused by internal components may be introduced into the RF integrated circuit 240. In this regard, the noise may be generated by internal components under an nth state condition. The baseband processor 264 may provide a noise information generation control signal NIG_CS to the RF controller 248, and the RF controller 248 may provide a frequency control signal F_CS to the PLL circuit 247 in response to the noise information generation control signal NIG_CS. The PLL circuit 247 may control the local oscillator 246 to generate a signal having a target frequency based on the frequency control signal F_CS.

In some example embodiments, the baseband processor 264 may change the frequency of the signal generated from the local oscillator 246 via the RF controller 248 and may separate the noise into a plurality of frequency bands by using the band-pass filter 243, the mixer 244, and the low-pass filter 245. The power measurer 266 may measure the magnitude of a noise signal N_B for each of the plurality of frequency bands. Hereinafter, the magnitude of the signal may mean the power (e.g., amplitude) of the signal. After the power measurer 266 measures the magnitude of the noise signal N_B for each frequency band under the nth state condition, the baseband processor 264 may control the operation of generating noise information about noise under the next state condition (e.g., an n+1th state condition).

Referring to FIG. 7B, unlike FIG. 7A, the wireless communication apparatus 200 is not shielded, and instead, the RF controller 248 provides a control signal DU_CS to the duplexer 241 in response to a noise information generation control signal NIG_CS received from the baseband processor 264 to disconnect the antenna 220 from the RF integrated circuit 240. Accordingly, the wireless communication apparatus 200 may not receive a signal from the outside or transmit a signal to the outside while generating noise information.

However, the configuration of the RF integrated circuit 240 shown in FIGS. 7A and 7B is an example only, and the inventive concepts are not limited thereto, and various other example embodiments for effectively isolating noise according to a frequency band may be used. Also, although the power measurer 266 and the baseband processor 264 of the modem 260 are shown as separate elements, they may be integrated into one element of the baseband processor 264.

Figure 8:
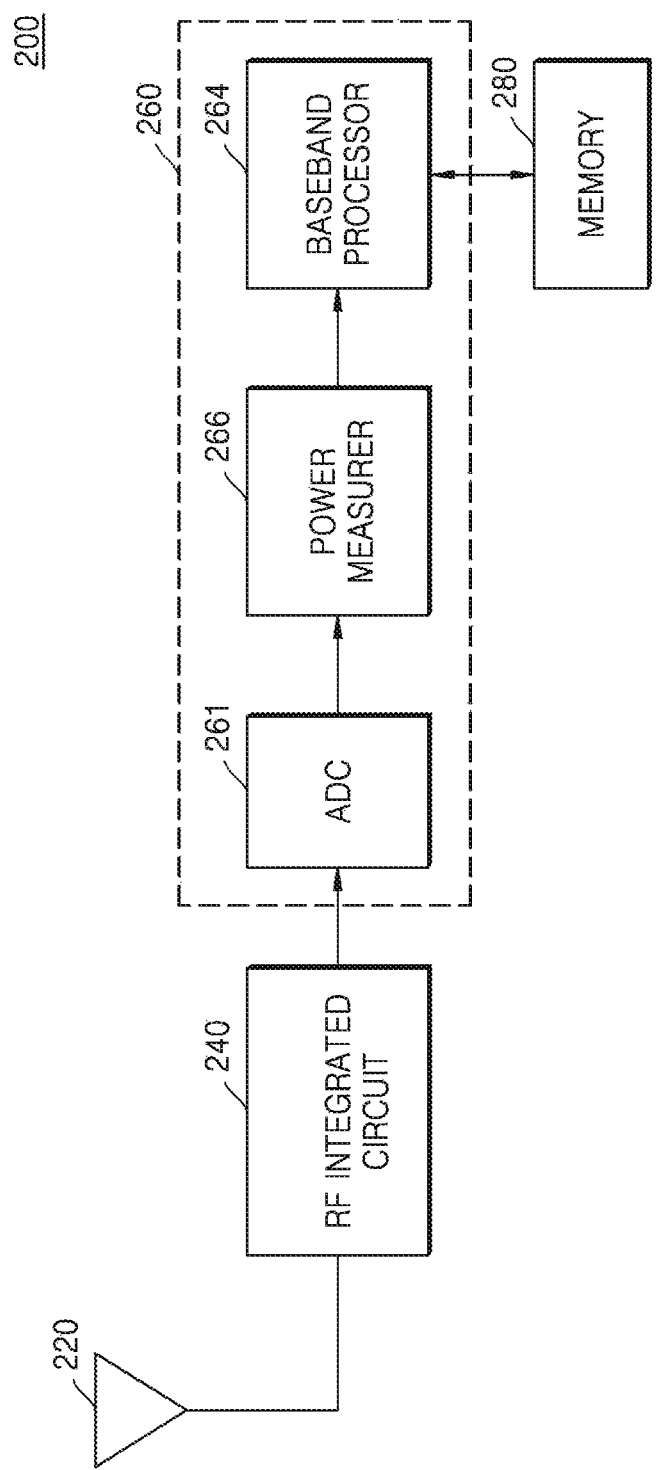
FIG. 8 shows a block diagram of a wireless communication apparatus 200 including an analog to digital converter 261 according to some example embodiments.
Figure 9A:
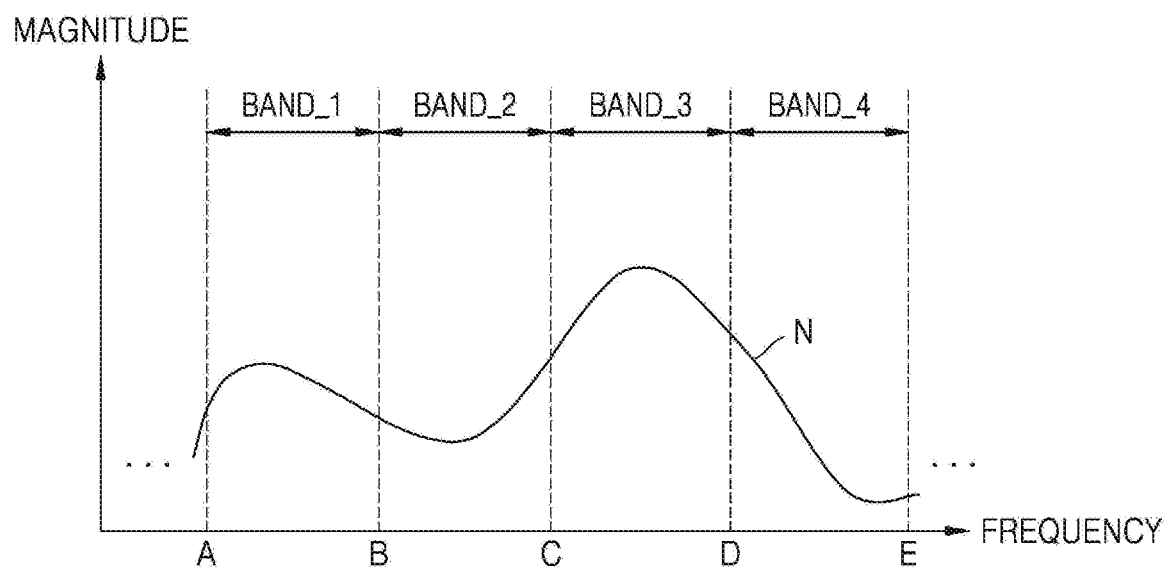
FIGS. 9A and 9B each show spectra to explain how to measure the magnitude of a noise by a power measurer illustrated in FIG. 8.
Figure 9B:
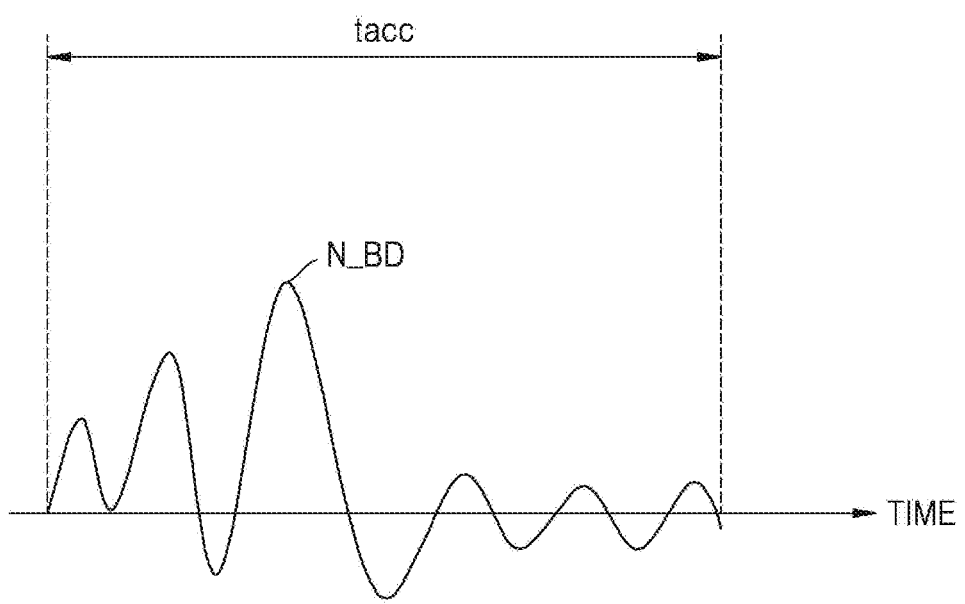

FIG. 8 shows a block diagram of the wireless communication apparatus 200 according to some example embodiments. FIGS. 9A and 9B show a graph to explain how to measure the magnitude of noise by the power measurer illustrated in FIG. 8.

Referring to FIG. 8, the wireless communication apparatus 200 may include the antenna 220, the RF integrated circuit 240, the modem 260, and a memory 280. The modem 260 may include an analog to digital converter (ADC) 261, the power measurer 266, and the baseband processor 264. According to some example embodiments, the ADC 261 may be implemented using circuits or circuitry and/or at least one processor executing firmware. Referring to FIGS. 7A and 7B, the modem 260 may receive noise signals separated according to a frequency band from the RF integrated circuit 240. The noise signals may be analog signals generated by filtering noise generated from the internal components of the wireless communication apparatus 200 under the nth state condition by the RF integrated circuit 240 and frequency down-converting the filtered noise.

Referring to FIG. 9A, noise signal (N) generated from internal components under the nth state condition may be separated into first through fourth frequency bands BAND_1 through BAND_4 by the RF integrated circuit 240. The width and central frequency of each of the firth through fourth frequency bands BAND_1 through BAND_4 may vary according to a communication method of the wireless communication apparatus 200. The ADC 261 may convert noise signals corresponding to each of the first through fourth frequency bands BAND_1 through BAND_4 into digital signals and may provide the digital signals to the power measurer 266. The power measurer 266 may measure amplitudes of each of the received and converted noise signals.

Referring to FIG. 9B, the power measurer 266 may measure the amplitude of each noise signal N_BD by accumulating the magnitude of the noise signal N_BD converted into the digital signal during a determined accumulation time (tacc). The accumulation time (tacc) may vary depending on the size measurement environment of the noise signal N_BD.

The power measurer 266 may provide the measured noise signal to the baseband processor 264, and the baseband processor 264 may generate noise information by using the magnitudes of the noise signal and the frequency band corresponding to the noise signal. The baseband processor 264 may store the generated noise information in the memory 280. After completing the generating of the noise information corresponding to the nth state condition, the baseband processor 264 may perform an operation for generating noise information corresponding to the next state condition.

FIG. 10 shows a diagram to explain noise information according to some example embodiments.

Referring to FIG. 10, the baseband processor (see 264 of FIG. 8) may store generated noise information NI_1, NI_2, . . . in the memory (see 280 of FIG. 8). The noise information may be defined as a state condition field, a frequency band field, and a magnitude of noise field. In some example embodiments, regarding first noise information NI_1, noise corresponding to a first frequency band BAND_1 under the first state condition SC_1 may have a first amplitude Amp_1, a noise corresponding to a second frequency band BAND_2 has a second amplitude Amp_2, a noise corresponding to a third frequency band BAND_3 has a third amplitude Amp_3, and a noise corresponding to a fourth frequency band BAND_4 has a fourth amplitude Amp_4. In this way, the noise information may associate the magnitude of noise to a corresponding frequency band under a certain state condition.

Figure 11:
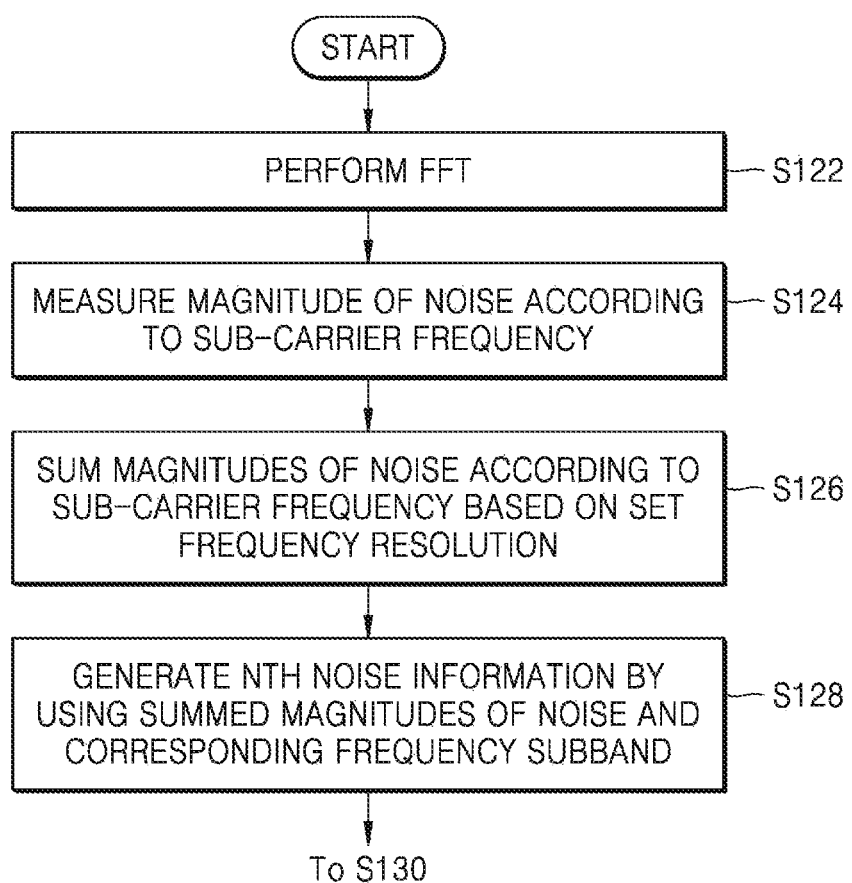
FIG. 11 is a flowchart to explain a method of generating noise information in such a way that a noise is separated according to a frequency subband.

FIG. 11 is a flowchart to explain a method of generating noise information in such a way that a noise is separated according to frequency subbands (also referred to as "frequency sub-bands" herein). Hereinafter, it is assumed that the wireless communication apparatus supports a fast Fourier transform function.

Referring to FIG. 11, after performing operation S110 (FIG. 6), the wireless communication apparatus (e.g., the wireless communication apparatus 200) may perform a fast Fourier transform (FFT) operation on a noise signal corresponding to the n-th frequency band (S122). As a result of the fast Fourier transform operation, the noise signal may be separated into a plurality of subcarrier frequencies. An interval between the subcarrier frequencies may correspond to a subcarrier spacing. The wireless communication apparatus may measure the magnitude of the noise signal corresponding to each of the plurality of subcarrier frequencies (S124). The wireless communication apparatus may sum the measured magnitudes of the noise signal corresponding to each of the plurality of subcarrier frequencies based on set frequency resolution (S126). For example, the wireless communication apparatus may separate the noise signal corresponding to the n-th frequency band into a plurality of frequency sub-bands according to a set frequency resolution with a smaller number of frequency sub-bands resulting in a lower frequency resolution. For each frequency sub-band, the wireless communication apparatus may sum the measured magnitudes of the noise signal corresponding to the subcarrier frequencies included within the frequency subband. The wireless communication apparatus may generate nth noise information by using the sum magnitude of the noise signal and a corresponding frequency subband (S128). By doing so, the wireless communication apparatus may generate noise information by separating the noise according to frequency subbands and measuring the magnitude of the noise and may perform a more sophisticated noise filtering operation based on the noise information.

Figure 12:
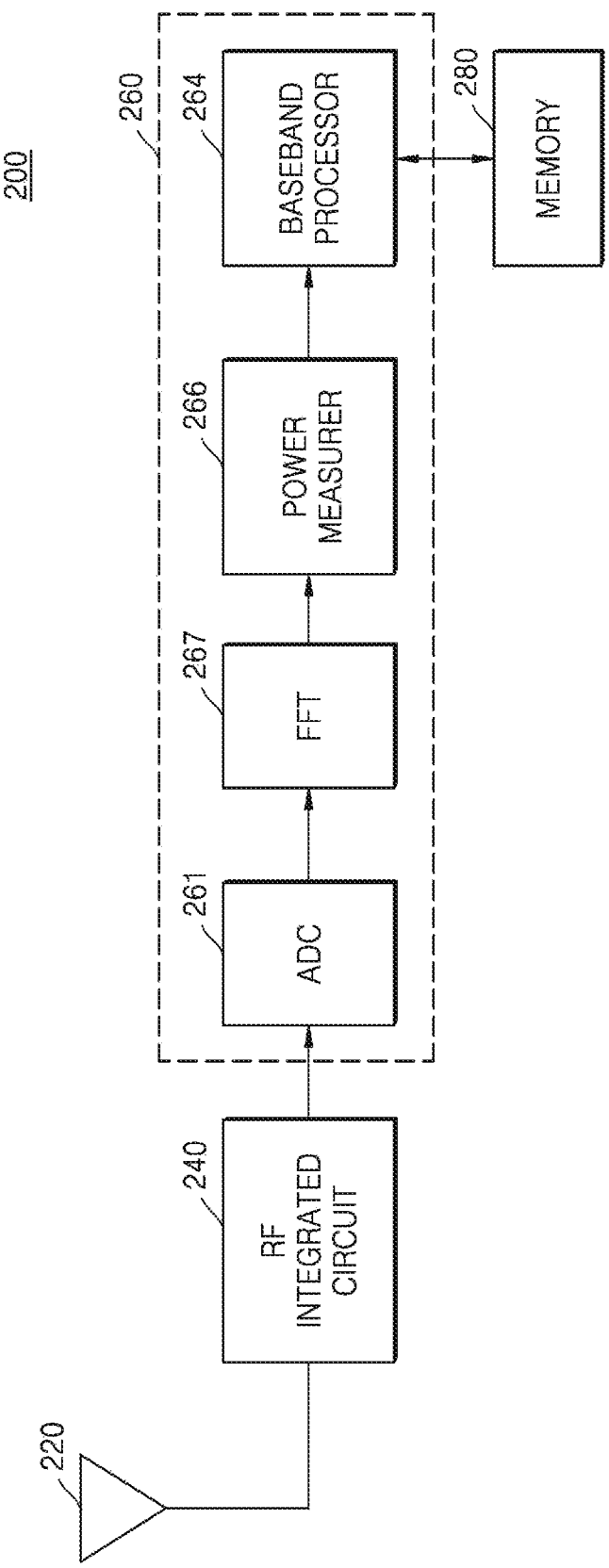
FIG. 12 is a block diagram illustrating a wireless communication apparatus supporting a fast Fourier transform function according to some example embodiments.
Figure 13:
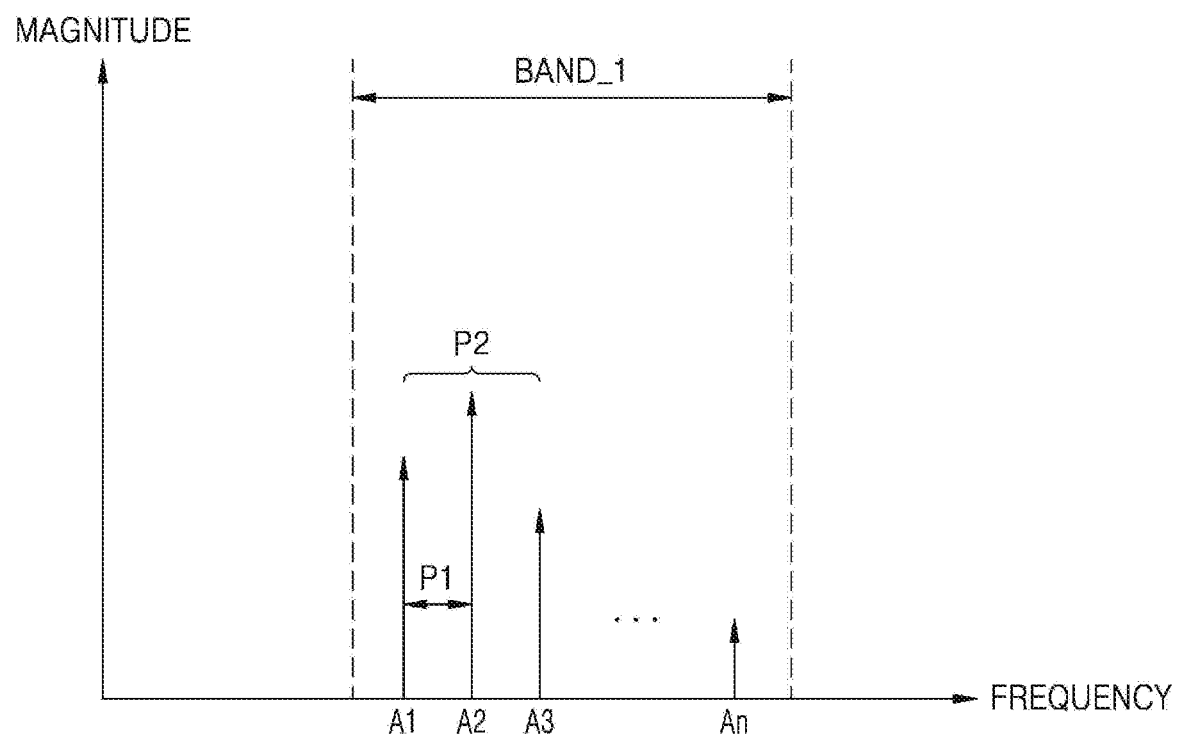
FIG. 13 is a graph of a fast Fourier transform result to explain frequency resolution.

FIG. 12 is a block diagram illustrating the wireless communication apparatus 200 supporting a fast Fourier transform function according to some example embodiments. FIG. 13 is a graph of a fast Fourier transform result to explain frequency resolution. FIG. 14 shows a diagram to explain noise information according to some example embodiments.

Referring to FIG. 12, the wireless communication apparatus 200 may include the antenna 220, the RF integrated circuit 240, the modem 260, and the memory 280. The modem 260 may further include an FFT circuit 267, unlike FIG. 8. According to some example embodiments, operations described herein as being performed by the FFT circuit 267 may be performed by at least one processor (e.g., the baseband processor 264) executing program code that includes instructions corresponding to the operations. The instructions may be stored in a memory of the wireless communication apparatus 200 (e.g., the memory 280). According to some example embodiments, the FFT circuit 267 may be implemented using circuits or circuitry and/or at least one processor executing firmware. Hereinafter, the operation of the FFT circuit 267 will be mainly described.

The FFT circuit 267 may receive, from the ADC 261, a noise signal according to a frequency band, wherein the noise signals are digital signals. Referring to FIG. 13, the FFT circuit 267 may perform a fast Fourier transform on the noise signal corresponding to the received first frequency band BAND_1 and may separate the noise signal into subcarrier frequencies having central frequencies A1 to An. A subcarrier frequency interval P1 may be determined according to the communication method of the wireless communication apparatus 200 and may correspond to subcarrier spacing.

The power measurer 266 may sum the magnitudes of the noise according to a subcarrier frequency based on the set frequency resolution. The frequency resolution may depend on the number of subcarriers P2, the magnitudes of which are summed. For example, the greater number of subcarriers, the magnitudes of which are summed, the lower frequency resolution, and vice versa. The frequency resolution may be dependent on the number of subcarriers P2, the magnitudes of which are summed, and may be changed by the baseband processor 264. The frequency range corresponding to subcarriers, the magnitudes of which are summed, may be defined as a frequency subband.

The power measurer 266 may provide the magnitude of the noise signal measured according to the frequency resolution to the baseband processor 264, and the baseband processor 264 may generate noise information by using the magnitudes of noise signals, a frequency band of each of the noise signals, and frequency sub-bands in each of the frequency bands.

Referring to FIG. 14, the baseband processor (see 264 of FIG. 12) may store generated noise information NI_1, NI_2, . . . in the memory (see 280 of FIG. 12). The noise information may be defined as a state condition field, a frequency band field, a frequency sub-band field, and a magnitude of noise field. In some example embodiments, under the first state condition SC_1, the first noise information NI_1 has the magnitudes of a noise Amp_1, Amp_2, Amp_3 in frequency sub-bands Sub_BAND_1a through Sub_BAND_3a in the first frequency band BAND_1. In this way, the noise information may include the magnitude of a noise signal for each frequency sub-band in the corresponding frequency band under each state condition. Regarding the noise information, the higher the frequency resolution, the more frequency sub-bands in the frequency band, and the lower the frequency resolution, the less the frequency sub-bands in the frequency band.

Figure 15:
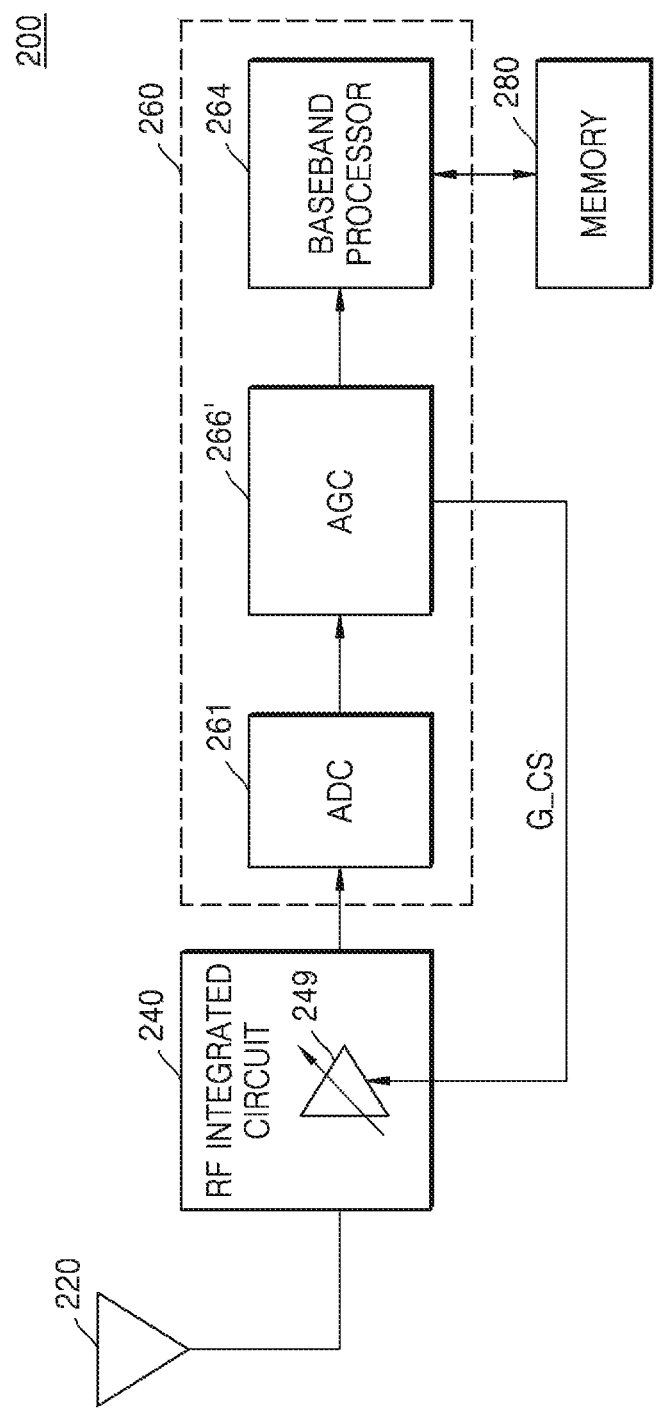
FIG. 15 is a block diagram illustrating a wireless communication apparatus supporting an automatic gain control function according to some example embodiments.

FIG. 15 illustrates a block diagram of the wireless communication apparatus 200 according to some example embodiments supporting an automatic gain control function.

Referring to FIG. 15, the wireless communication apparatus 200 may include the antenna 220, the RF integrated circuit 240, the modem 260, and the memory 280. The power measurer (see 266 of FIG. 8) in the modem 260 may be implemented as an automatic gain control circuit 266'. The RF integrated circuit 240 may further include a variable gain amplifier 249 for amplifying a noise signal. According to some example embodiments, operations described herein as being performed by the automatic gain control circuit 266' may be performed by at least one processor (e.g., the baseband processor 264) executing program code that includes instructions corresponding to the operations. The instructions may be stored in a memory of the wireless communication apparatus 200 (e.g., the memory 280). According to some example embodiments, the automatic gain control circuit 266' and the variable gain amplifier 249 may be implemented using circuits or circuitry and/or at least one processor executing firmware. The automatic gain control circuit 266' may control the gain of the variable gain amplifier 249 (e.g., using a gain control signal G_CS) to cause the variable gain amplifier 249 to output an amplified noise signal having a constant magnitude. The automatic gain control circuit 266' may measure the magnitude of the actual noise signal by using gain-related information of the variable gain amplifier 249. By applying automatic gain control to measure the magnitude of the noise signal, it is possible to effectively increase the dynamic range that may distinguish the magnitude of the noise signal.

Figure 16:
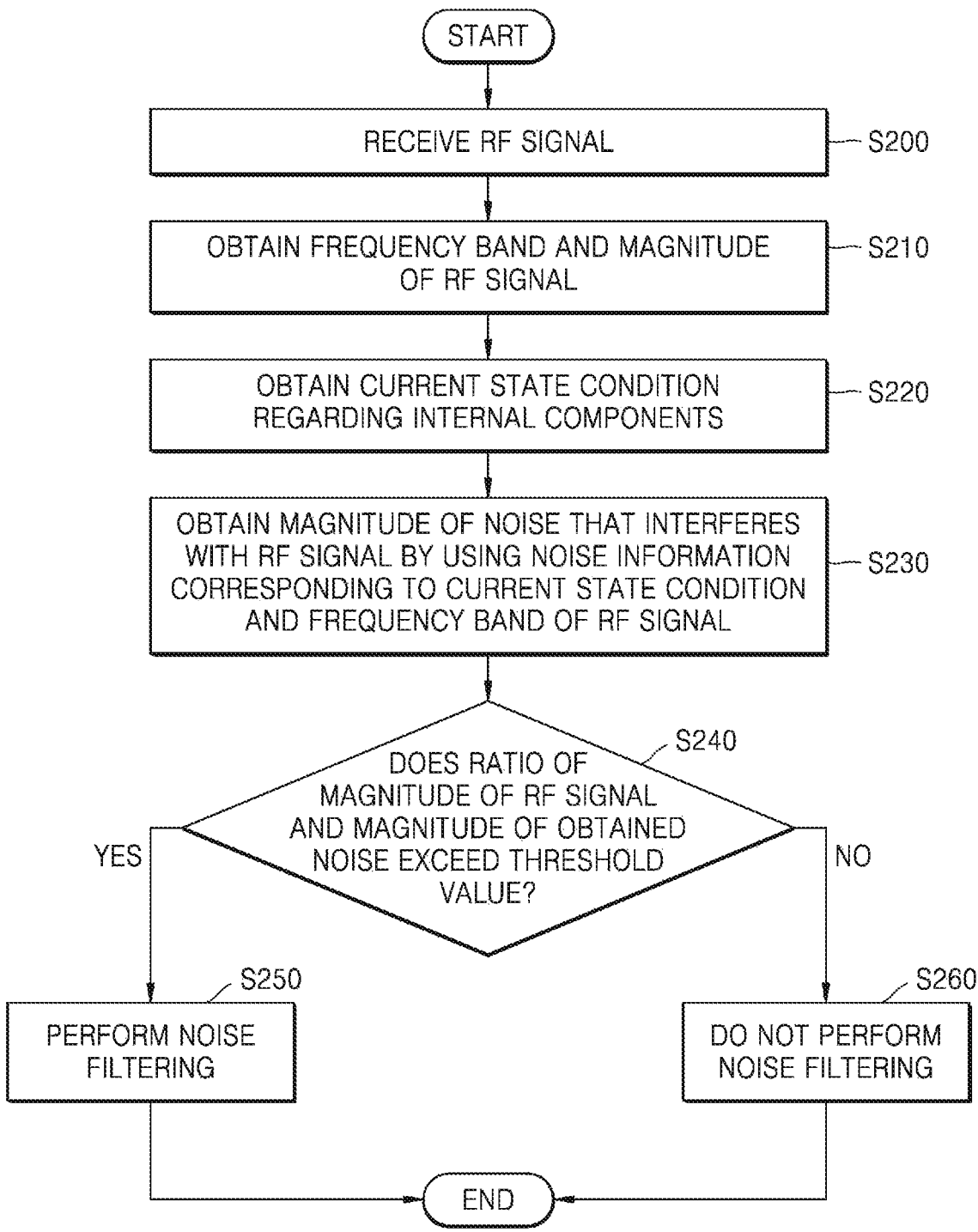
FIG. 16 is a flowchart to explain a selective noise filtering operation performed by a wireless communication apparatus according to some example embodiments.

FIG. 16 is a flowchart to explain a selective noise filtering operation performed by a wireless communication apparatus according to some example embodiments.

Referring to FIG. 16, a wireless communication apparatus (e.g., the wireless communication apparatus 200) may receive an RF signal for wireless communication (S200) from outside of the wireless communication apparatus (also referred to herein as "the outside"). The wireless communication apparatus may obtain the frequency band of the RF signal and the magnitude of the RF signal (S210). For example, the wireless communication apparatus may perform a cell search operation to find a physical broadcast channel (PBCH) and may obtain information about the frequency band in which an RF signal exists from the PBCH. The wireless communication apparatus may measure the magnitude of the RF signal according to the communication standard of the RF signal. For example, the magnitude of the measured RF signal may correspond to any one of a received signal strength indicator (RSSI), reference signal received power (RSRP), and a reference signal received quality (RSRQ) depending on the communication method by which the RF signal is received. The RSSI represents the total magnitude of all signals received by the wireless communication apparatus and may include interference from a channel adjacent to the signal, and thermal noise. The RSRP may be determined based on the magnitude of a reference signal received by the wireless communication apparatus. The RSRQ may be determined based on the ratio of the magnitude of all signals received by the wireless communication apparatus to the magnitude of the reference signal.

The wireless communication apparatus may obtain the current state condition about internal components (S220). The wireless communication apparatus may include an application processor for controlling internal components and may obtain a state condition corresponding to the current operation mode of the internal components through the application processor. The wireless communication apparatus may obtain the magnitude of the noise that interferes with the RF signal by using noise information corresponding to the current state condition and the frequency band of the RF signal (S230). For example, referring to FIG. 10, assuming that the current state condition corresponds to the first state condition SC_1 and the frequency band of the RF signal corresponds to the second frequency band BAND_2, from the first noise information NI_1 corresponding to the current state condition, that is, the first state condition SC_1, the wireless communication apparatus may obtain the second magnitude Amp_2 as the magnitude of the noise matched with the frequency band BAND_2 of the RF signal. According to some example embodiments, the wireless communication apparatus may match noise information corresponding to a current state condition with a frequency band of the RF signal to generate matching results (e.g., may identify stored noise information corresponding to the current state condition and the frequency band of the RF signal). The wireless communication apparatus may then determine the magnitude of the noise signal based on the matching results (e.g., may identify a noise signal magnitude corresponding to the identified current state condition and frequency band of the RF signal).

The wireless communication apparatus may determine whether the ratio between the magnitude of the RF signal and the magnitude of obtained noise exceeds a threshold value (S240). The threshold value is a value that is set in the wireless communication apparatus and may be changed according to the communication environment of the wireless communication apparatus. When the ratio exceeds the threshold value (S240, YES), the wireless communication apparatus may perform noise filtering (S250). Otherwise, when the ratio does not exceed the threshold value (S240, NO), the wireless communication apparatus may not perform the noise filtering (S260).

In other words, when there is noise in the frequency band wireless being identical or similar to the RF signal and thus, the RF signal is interfered, the wireless communication apparatus may perform noise-filtering to prevent the degradation of the communication performance due to the noise, and when the noise does not affect the RF signal, the noise filtering may be skipped and power consumption caused by a noise filter may be reduced.

In conventional wireless communication apparatuses, noise analysis is performed based on signals received through a separate external antenna. Accordingly, in the conventional devices it is difficult to distinguish the influence of internal component noise (as distinguished from noise generated outside of the wireless communication apparatus) on a modem in the wireless communication apparatus. Without adequately identifying noise signals generated from the internal components of the wireless communication apparatus, it is difficult to reduce or eliminate the deterioration of communication performance due to the noise signals.

According to some example embodiments, a wireless communication apparatus (e.g., the wireless communication apparatus 200) identifies the characteristics of noise signals generated during different operation modes of internal components of the wireless communication apparatus in advance. These characteristics are then stored as noise information in the memory of the wireless communication apparatus for use in filtering the noise signals during wireless communication. Accordingly, the wireless communication apparatus reduces or eliminates the deterioration of communication performance otherwise caused by internal component noise.

Figure 17:
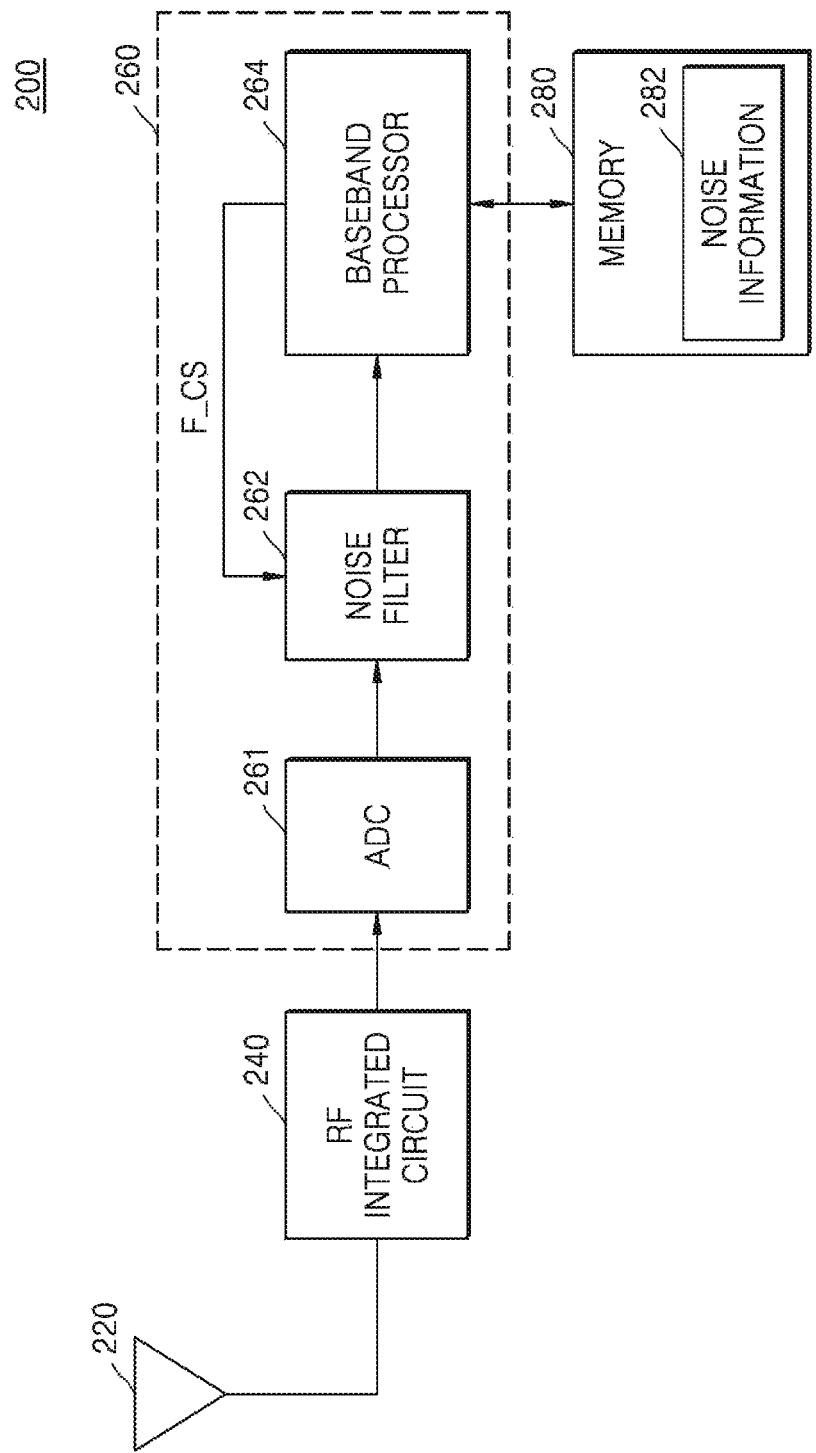
FIG. 17 is a block diagram to explain a selective noise filtering by a wireless communication apparatus according to some example embodiments.

FIG. 17 is a block diagram to explain a selective noise filtering by the wireless communication apparatus 200 according to some example embodiments.

Referring to FIG. 17, the wireless communication apparatus 200 may include the antenna 220, the RF integrated circuit 240, the modem 260, and the memory 280. The modem 260 may include the ADC 261, a noise filter 262, and the baseband processor 264. According to some example embodiments, the noise filter 262 may be similar to or the same as the noise filter 162. When performing the wireless communication operation, the baseband processor 264 may obtain, by using the noise information 282, the magnitude of the noise that interferes with the RF signal received from the outside. In some example embodiments, the baseband processor 264 may obtain information about the current state condition according to the current operation mode of the internal components from the application processor (see 171 of FIG. 4). The baseband processor 264 accesses the memory 280 to detect (e.g., identify) noise information corresponding to the current state condition among the noise information 282 and obtains (e.g., from the memory 280) the magnitude of the noise that interferes with the RF signal from the detected noise information.

The baseband processor 264 provides the noise filter 262 with a filter control signal F_CS based on whether the ratio between the magnitude of the RF signal and the magnitude of the obtained noise exceeds a threshold value, and thus, turns on (or activates) or turns off (or deactivates) the noise filter 262.

The noise filter 262, when turned on, may remove noise generated from internal components that are in the frequency band that is identical or similar to the frequency band of the RF signal, from the RF signal.

Figure 18:
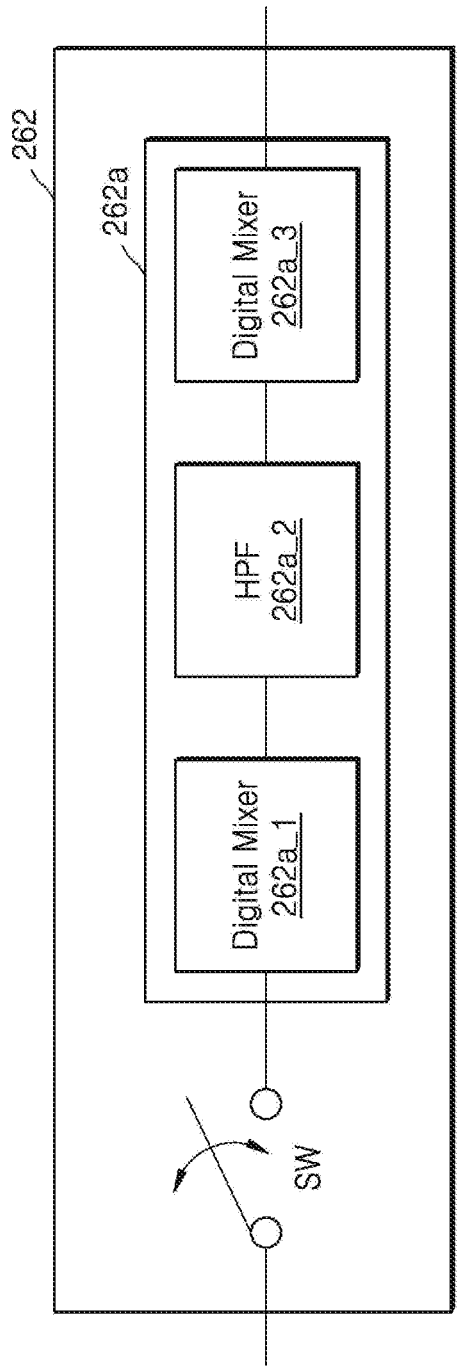
FIG. 18 is a block diagram of an example of a noise filter illustrated in FIG. 17.

FIG. 18 is a block diagram of an example of the noise filter 262 illustrated in FIG. 17.

Referring to FIG. 18, the noise filter 262 may include a switch SW and a tone rejection filter 262a. The tone rejection filter 262a may include digital mixers 262a_1 and 262a_3 and a high-pass filter 262a_2. According to some example embodiments, the switch SW, the digital mixer 262a_1, the high-pass filter 262a_2 and the digital mixer 262a_3 may be implemented using circuits or circuitry and/or at least one processor executing firmware. The tone rejection filter 262a converts the frequency of the noise to be removed into a direct signal (DC) signal through the digital mixer 262a_1 (or converts the frequency of the noise to be removed into a low-frequency band) and passes through the high pass filter 262a_2 to remove noise. In some example embodiments, the high pass filter 262a_2 may be implemented as an infinite impulse response (IIR) filter, a finite impulse response (FIR) filter, or the like, and the high pass filter 262a_2 may operate as a DC eliminator. Thereafter, the signal may be converted into a signal having the original frequency band through the digital mixer 262a_3.

In addition, the baseband processor (see 264 of FIG. 17) may control turning the noise filter 262 on/off by controlling the switch SW. However, the noise filter 262 illustrated in FIG. 18 is an example only, and the noise filter 262 may be variously implemented in a configuration capable of removing noise and capable of being turned on/off.

Figure 19A:
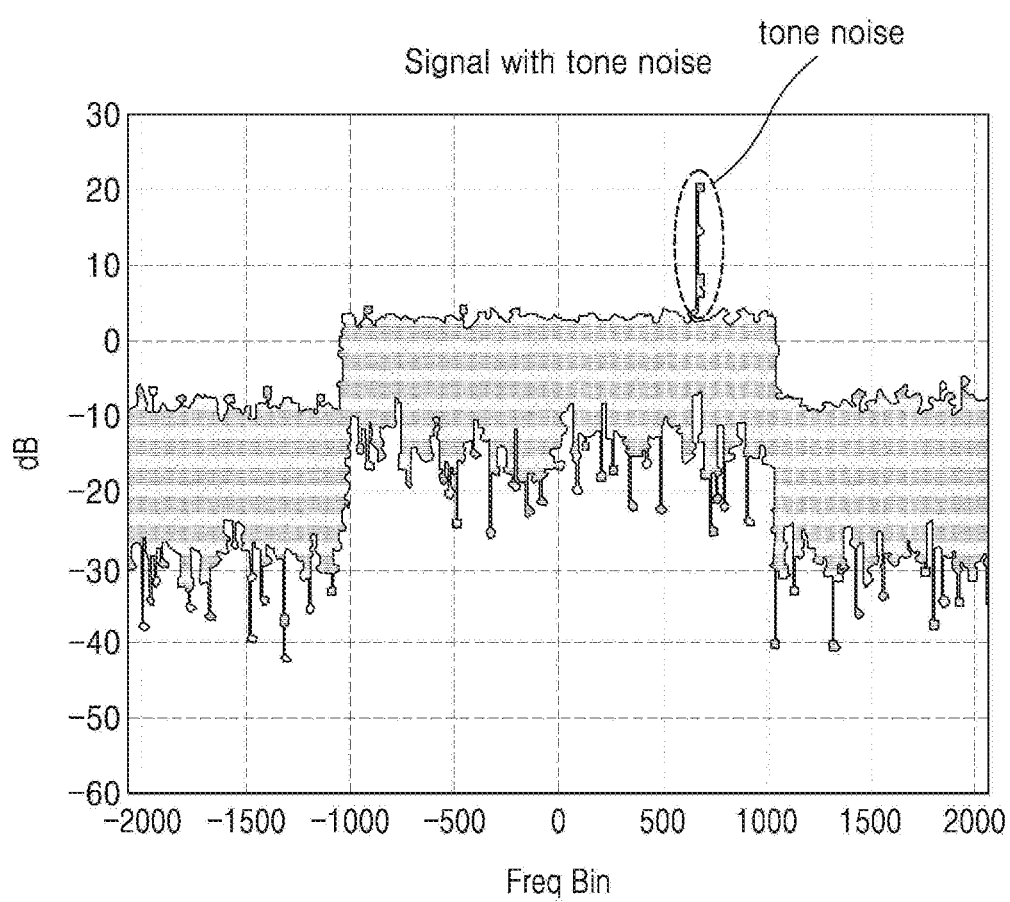
FIGS. 19A and 19B depict the spectra of a radio frequency (RF) signal showing the removal or attenuation of tone noise by a noise filter illustrated in FIG. 18.
Figure 19B:
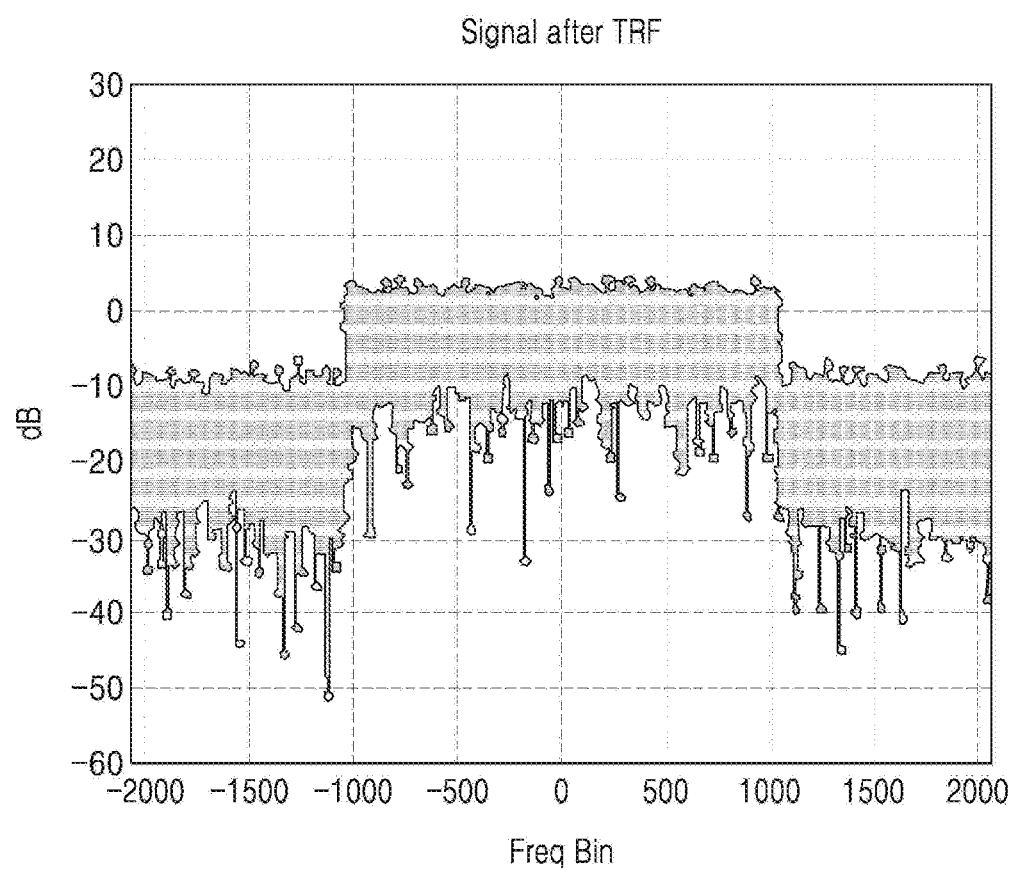

FIGS. 19A and 19B depict the spectra of an RF signal showing the removal or attenuation of tone noise by the noise filter illustrated in FIG. 18.

Referring to FIG. 19A, the communication performance (in particular, the reception performance) of the RF signal received in the wireless communication apparatus may be degraded due to the introduction of tone noise generated from internal components. Therefore, a wireless communication apparatus (e.g., the wireless communication apparatus 200) according to some example embodiments may obtain information about a tone noise that interferes with RF signals by using noise information and may perform noise filtering to remove the tone noise.

Referring to FIG. 19B, when the ratio between the magnitude of the RF signal to the magnitude of the tone noise exceeds a threshold value, the wireless communication apparatus may perform tone rejection filtering on the tone noise through a noise filter. As a result, communication performance may be improved by eliminating the tone noise, which interferes with the RF signal.

Figure 20:
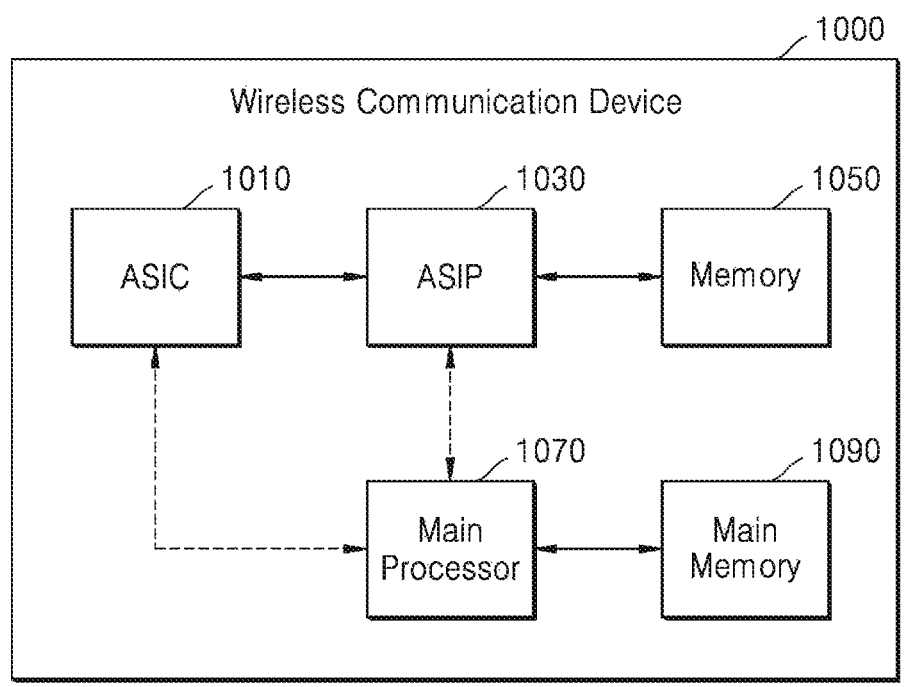
FIG. 20 shows a block diagram of a wireless communication apparatus 1000 according to some example embodiments.

FIG. 20 shows a block diagram of a wireless communication apparatus 1000 according to some example embodiments.

Referring to FIG. 20, the wireless communication apparatus 1000, an example of a communication device, may include an Application Specific Integrated Circuit (ASIC) 1010, an Application Specific Instruction Set Processor (ASIP) 1030, a memory 1050, at least one main processor 1070, and a main memory 1090. Two or more of the ASIC 1010, the ASIP 1030, and the main processor 1070 may communicate with each other. At least two of the ASIC 1010, the ASH' 1030, the memory 1050, the main processor 1070, and the main memory 1090 may be embedded in one chip.

The ASIP 1030 is an integrated circuit customized for a particular application and may support an instruction set for a particular application and execute instructions in the instruction set. The memory 1050 may communicate with the ASIP 1030 and may store a plurality of instructions executed by the ASH' 1030 as a non-volatile storage. In addition, the memory 1050 may include any type a memory accessible by the ASH' 1030, such as Random Access Memory (RAM), Read Only Memory (ROM), a magnetic tape, a magnetic disk, an optical disk, a volatile memory, a nonvolatile memory, or a combination thereof. By executing a series of instructions stored in the memory 1050, the ASIP 1030 or the main processor 1070 generates noise information about the noise generated from the internal components and performs selective noise filtering by using the noise information, as described in connection with FIG. 1.

The main processor 1070 may control the wireless communication apparatus 1000 by executing a plurality of instructions. For example, the main processor 1070 may control the ASIC 1010 and the ASIP 1030 and may process data received via the wireless communication network or process user input to the wireless communication apparatus 1000. The main memory 1090 may communicate with the main processor 1070 and, as non-volatile storage, may store a plurality of instructions executed by the main processor 1070.

The various operations of methods described above may be performed by any suitable means capable of performing the operations, such as various hardware and/or software implemented in some form of hardware (e.g., processor, ASIC, etc.).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been described with reference to some example embodiments illustrated in the drawings, these example embodiments are provided herein for illustrative purpose only, and one of ordinary skill in the art may understand that some example embodiments include various modifications and equivalent example embodiments thereof. Accordingly, the true scope of the inventive concepts should be determined by the technical idea of the appended claims.

What is claimed is:

1. A method performed by at least one processor of a wireless communication apparatus including a plurality of internal components, the method comprising:

generating, by the at least one processor, a plurality of sets of noise information corresponding to a plurality of test noise signals generated by the plurality of internal components under a plurality of state conditions;

receiving, by the at least one processor, a radio frequency (RF) signal;

determining, by the at least one processor, a magnitude of a noise signal generated by the plurality of internal components that interferes with the RF signal by using a set of noise information corresponding to a current state condition from among the plurality of sets of noise information; and performing, by the at least one processor, noise filtering on the RF signal based on a ratio between a magnitude of the RF signal and the magnitude of the noise signal.

2. The method of claim 1, wherein the at least one processor does not receive or send a signal via an antenna during the generating the plurality of sets of noise information.

3. The method of claim 1, wherein the plurality of sets of noise information include a frequency and a magnitude of test noise signals among the plurality of test noise signals generated under each of the plurality of state conditions.

4. The method of claim 1, wherein each test noise signal of the plurality of test noise signals is respectively generated under a different state condition among the plurality of state conditions.

5. The method of claim 1, wherein the generating the plurality of sets of noise information includes, performing, by the at least one processor, for each of a plurality of values of n, n being a natural number of 1 or more, separating, by the at least one processor, an nth test noise signal generated under an nth state condition into a plurality of frequency bands such that each frequency band among the plurality of frequency bands has a center frequency and bandwidth defined based on a communication method, measuring, by the at least one processor, a magnitude of each of the plurality of frequency bands to generate a plurality of frequency band magnitudes, and generating, by the at least one processor, an nth set of noise information among the plurality of sets of noise information by using the plurality of frequency band magnitudes.

6. The method of claim 5, wherein the measuring the magnitude of each of the plurality of frequency bands comprises:

accumulating, by the at least one processor, the magnitude of each of the plurality of frequency bands for a certain period of time.

7. The method of claim 1, wherein the determining the magnitude of the noise signal further comprises:

matching, by the at least one processor, the set of noise information corresponding to the current state condition with a frequency band of the RF signal to generate matching results; and determining, by the at least one processor, the magnitude of the noise signal based on the matching results.

8. The method of claim 1, wherein the magnitude of the RF signal corresponds to one of a received signal strength indicator (RSSI), a reference signal received power (RSRP), or a reference signal received quality (RSRQ).

9. The method of claim 1, wherein the performing noise filtering further comprises:

determining, by the at least one processor, whether the ratio between the magnitude of the RF signal and the magnitude of the noise signal exceeds a threshold value to generate a comparison result; and performing, by the at least one processor, noise filtering based on the comparison result.

10. The method of claim 1, wherein the performing noise filtering filters the noise signal by using a tone rejection filter.

11. A wireless communication apparatus comprising:
a plurality of internal components;
a memory configured to store,
  computer-readable instructions, and
  a plurality of sets of noise information corresponding to a plurality of test noise signals generated by the plurality of internal components under a plurality of state conditions;
a radio frequency (RF) integrated circuit configured to process an RF signal; and
at least one processor configured to execute the computer-readable instructions to,
  determine a magnitude of a noise signal generated by the plurality of internal components that interferes with the RF signal by using a set of noise information corresponding to a current state condition from among the plurality of sets of noise information, and
  perform noise filtering on the RF signal based on a ratio between a magnitude of the RF signal and the magnitude of the noise signal.

12. The wireless communication apparatus of claim 11, wherein the at least one processor is configured to execute the computer-readable instructions to:
control the RF integrated circuit not to receive an external signal when the plurality of sets of noise information is generated.

13. The wireless communication apparatus of claim 12, wherein the at least one processor is configured to execute the computer-readable instructions to:
generate the plurality of sets of noise information under each of the plurality of state conditions based on,
  a frequency band of a respective test noise signal among the plurality of test noise signals output from the RF integrated circuit, and
  a magnitude of the respective test noise signal according to the frequency band.

14. The wireless communication apparatus of claim 13, wherein:
the RF integrated circuit comprises a variable gain amplifier; and
the at least one processor is configured to execute the computer-readable instructions to,
  control a gain of the variable gain amplifier to obtain a constant magnitude of the respective test noise signal, and
  measure the magnitude of the respective test noise signal according to the frequency band using the gain of the variable gain amplifier.

15. The wireless communication apparatus of claim 13, wherein:
the RF integrated circuit comprises a filter; and
the at least one processor is configured to execute the computer-readable instructions to,
  separate the respective test noise signal into a plurality of frequency bands by controlling the RF integrated circuit to change a degree of frequency down-conversion of the respective test noise signal.

16. The wireless communication apparatus of claim 11, further comprising:
an application processor configured to communicate with the plurality of internal components,
wherein the at least one processor is configured to execute the computer-readable instructions to determine the current state condition using information received from the application processor corresponding to a current operation mode of each of the plurality of internal components.

17. The wireless communication apparatus of claim 11, wherein:
the at least one processor is configured to execute the computer-readable instructions to,
  match the set of noise information corresponding to the current state condition with a frequency band of the RF signal to generate matching results, and
  determine the magnitude of the noise signal based on the matching results.

18. The wireless communication apparatus of claim 11, further comprising:
a noise filter,
wherein at least one processor is configured to execute the computer-readable instructions to turn the noise filter on or off based on whether the ratio of the magnitude of the RF signal to the magnitude of the noise signal exceeds a threshold value.

* * * * *